United States Patent
Van Wiemeersch et al.

(10) Patent No.: US 9,752,370 B2
(45) Date of Patent: Sep. 5, 2017

(54) RAIN ONSET DETECTION AUTO-CLOSE USER INTERFACE

(71) Applicant: Ford Global Technologies, LLC, Dearborn, MI (US)

(72) Inventors: John Robert Van Wiemeersch, Novi, MI (US); Patrick Kevin Holub, Novi, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 14/797,682

(22) Filed: Jul. 13, 2015

(65) Prior Publication Data

US 2017/0016266 A1    Jan. 19, 2017

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *E05F 15/71* | (2015.01) |
| *E05F 15/77* | (2015.01) |
| *B60J 7/00* | (2006.01) |
| *B60J 1/00* | (2006.01) |

(Continued)

(52) U.S. Cl.
CPC ............... *E05F 15/71* (2015.01); *B60J 1/00* (2013.01); *B60J 7/00* (2013.01); *B60K 35/00* (2013.01); *E05F 15/77* (2015.01); *G08B 21/18* (2013.01); *B60K 2350/1004* (2013.01)

(58) Field of Classification Search
CPC . E05F 15/71; E05F 15/74; E05F 15/77; E05F 15/70; B60J 1/00; B60J 7/00; B60K 35/00; B60K 2350/1004; G08B 21/18
USPC ........................................................... 701/2
See application file for complete search history.

(56) References Cited

U.S. PATENT DOCUMENTS

| | | |
|---|---|---|
| 4,613,802 A | 9/1986 | Kraus et al. |
| 4,908,554 A | 3/1990 | Chance |
| 5,293,105 A | 3/1994 | West, Jr. |

(Continued)

FOREIGN PATENT DOCUMENTS

| | | |
|---|---|---|
| CN | 202039718 U | 11/2011 |
| CN | 202080220 U | 12/2011 |

(Continued)

OTHER PUBLICATIONS

Non-Final Office Action dated May 8, 2015 for U.S. Appl. No. 13/847,033.

(Continued)

*Primary Examiner* — Jaime Figueroa
(74) *Attorney, Agent, or Firm* — Franklin A. MacKenzie; Brooks Kushman P.C.

(57) ABSTRACT

A vehicle controller may receive notification settings to apply when determining rain conditions. The controller may identify a rain condition sensor data, and send a rain alert to a mobile device to obtain confirmation to perform rain condition actions specified by the notification settings. The mobile device may receive, from the vehicle controller, the rain alert requesting confirmation to perform rain condition actions specified by the notification settings; and may send, responsive to user input to the mobile device, a confirmation to perform the rain condition actions.

19 Claims, 16 Drawing Sheets

(51) Int. Cl.
 *B60K 35/00* (2006.01)
 *G08B 21/18* (2006.01)

(56) References Cited

U.S. PATENT DOCUMENTS

| | | | |
|---|---|---|---|
| 5,321,345 | A | 6/1994 | Lambros et al. |
| 5,402,075 | A | 3/1995 | Lu et al. |
| 5,459,380 | A | 10/1995 | Augustinowicz |
| 6,094,981 | A | 8/2000 | Hochstein |
| 6,243,022 | B1 * | 6/2001 | Furukawa ............... B60J 1/20 180/271 |
| 6,933,831 | B2 | 8/2005 | Ieda et al. |
| 7,106,172 | B2 | 9/2006 | Neveux et al. |
| 7,513,148 | B2 | 4/2009 | Mouridsen |
| 7,548,809 | B2 | 6/2009 | Westerhoff |
| 8,330,593 | B2 | 12/2012 | Golenski |
| 8,538,408 | B2 | 9/2013 | Howarter et al. |
| 8,558,690 | B2 | 10/2013 | Kleve et al. |
| 2001/0052839 | A1 | 12/2001 | Nahata et al. |
| 2002/0143452 | A1 | 10/2002 | Losey |
| 2003/0098784 | A1 * | 5/2003 | Van Bosch ......... B60R 25/1004 340/425.5 |
| 2005/0187689 | A1 | 8/2005 | Westerhoff |
| 2005/0219043 | A1 * | 10/2005 | Pollmann ............... E05B 81/78 340/426.28 |
| 2006/0220806 | A1 * | 10/2006 | Nguyen ................ B60R 25/102 340/426.36 |
| 2007/0188122 | A1 | 8/2007 | Andrejciw |
| 2009/0021112 | A1 | 1/2009 | Kondou et al. |
| 2009/0120001 | A1 | 5/2009 | Sugiura |
| 2010/0019510 | A1 | 1/2010 | Ieda et al. |
| 2010/0023210 | A1 | 1/2010 | Flick |
| 2010/0136917 | A1 | 6/2010 | Castandet |
| 2010/0305807 | A1 * | 12/2010 | Basir ................... B60R 16/0373 701/31.4 |
| 2011/0190962 | A1 * | 8/2011 | Peterson ................... G06F 7/00 701/2 |
| 2012/0089299 | A1 * | 4/2012 | Breed ..................... B60C 11/24 701/36 |
| 2012/0116608 | A1 * | 5/2012 | Park ................... B60H 1/00657 701/2 |
| 2012/0200388 | A1 | 8/2012 | Miura et al. |
| 2012/0267442 | A1 | 10/2012 | Choi |
| 2012/0286813 | A1 | 11/2012 | Murphy |
| 2013/0265178 | A1 * | 10/2013 | Tengler ................... H04W 4/00 340/989 |
| 2014/0288784 | A1 | 9/2014 | Van Wiemeersch |
| 2015/0134207 | A1 * | 5/2015 | Park ...................... E05F 15/695 701/49 |
| 2015/0221142 | A1 * | 8/2015 | Kim ....................... G07C 5/008 701/31.5 |
| 2015/0283914 | A1 * | 10/2015 | Malone ................... B60H 1/004 701/49 |
| 2015/0364027 | A1 * | 12/2015 | Haupt ..................... G01W 1/02 340/521 |
| 2016/0147222 | A1 * | 5/2016 | Haberl ................. G05D 1/0016 701/2 |

FOREIGN PATENT DOCUMENTS

| | | |
|---|---|---|
| EP | 0890143 B1 | 12/2001 |
| FR | 2916221 A1 | 5/2007 |

OTHER PUBLICATIONS

Notice of Allowance dated Nov. 19, 2014 for U.S. Appl. No. 13/847,033.

* cited by examiner

RAIN ONSET DETECTION AUTO-CLOSE USER INTERFACE

TECHNICAL FIELD

Aspects of the disclosure generally relate to a user interface for rain onset detection auto-close functionality of a vehicle.

BACKGROUND

Systems have been proposed for closing powered vehicle windows (windows including, but not limited to, for example, front and rear door windows, window side vents, sunroofs, moon-roofs, and convertible roofs) in the event of rain. These systems typically use dedicated rain sensors, and perform automatic window close actions based on detected precipitation. These approaches may seem logical, but they are not cost effective in terms of parts cost or in terms of key-off-load (KOL) electrical current budget for a parked vehicle. Adding a sensor solely to monitor for rain proves difficult from a business perspective, as rain entering windows is a relatively unlikely scenario. Thus, while auto-close window features may be welcome for little to no additional cost, customers may be unwilling to pay extra for such a rarely used option.

To address the cost of additional sensors, some systems propose use of existing windshield rain sensors employed to activate or change wiper speed according to windshield wetness. These systems may sample the windshield rain sensor while the vehicle is off, and may provide an auto-close feature upon detection of wet glass. However, such systems are impractical for vehicles lacking smart wiper systems, and are not cost-effective from a KOL perspective, as windshield rain sensors consume considerable KOL while active. To keep additional KOL manageable, the windshield rain sensors may be sampled at long intervals, but this may reduce the effectiveness of such a system below acceptable limits.

As yet a further disadvantage, such systems fail to take into account safety considerations for animals or persons that may be in the vehicle cabin when an auto-close event occurs. For instance, if rain conditions yield to sunny weather, the vehicle cabin may experience a dangerous increase in temperature due to increased sun load.

SUMMARY

In a first illustrative embodiment, a system includes a telematics control unit; and a controller in communication with the telematics control unit and a plurality of capacitive sensors, programmed to access notification settings to determine a mobile device to notify of a rain condition identified using the sensors; command the telematics control unit to send a rain alert to the mobile device to obtain confirmation to perform rain condition actions; and close vehicle openings responsive to receiving the confirmation.

In a second illustrative embodiment, a computer-implemented method includes receiving, from a mobile device of a user, notification settings to apply to a vehicle controller determining rain conditions; identifying, by the vehicle controller, a rain condition according to a capacitive change across sensor data received from a plurality of external capacitive sensors of the vehicle; and sending a rain alert to the mobile device to obtain confirmation to perform rain condition actions specified by the notification settings.

In a third illustrative embodiment, a system includes a mobile device programmed to display a user interface for specifying notification settings to apply to a vehicle controller programmed to determine rain conditions; receive, from the vehicle controller, a rain alert requesting confirmation to perform rain condition actions specified by the notification settings; and send, responsive to user input to the mobile device, a confirmation to perform the rain condition actions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
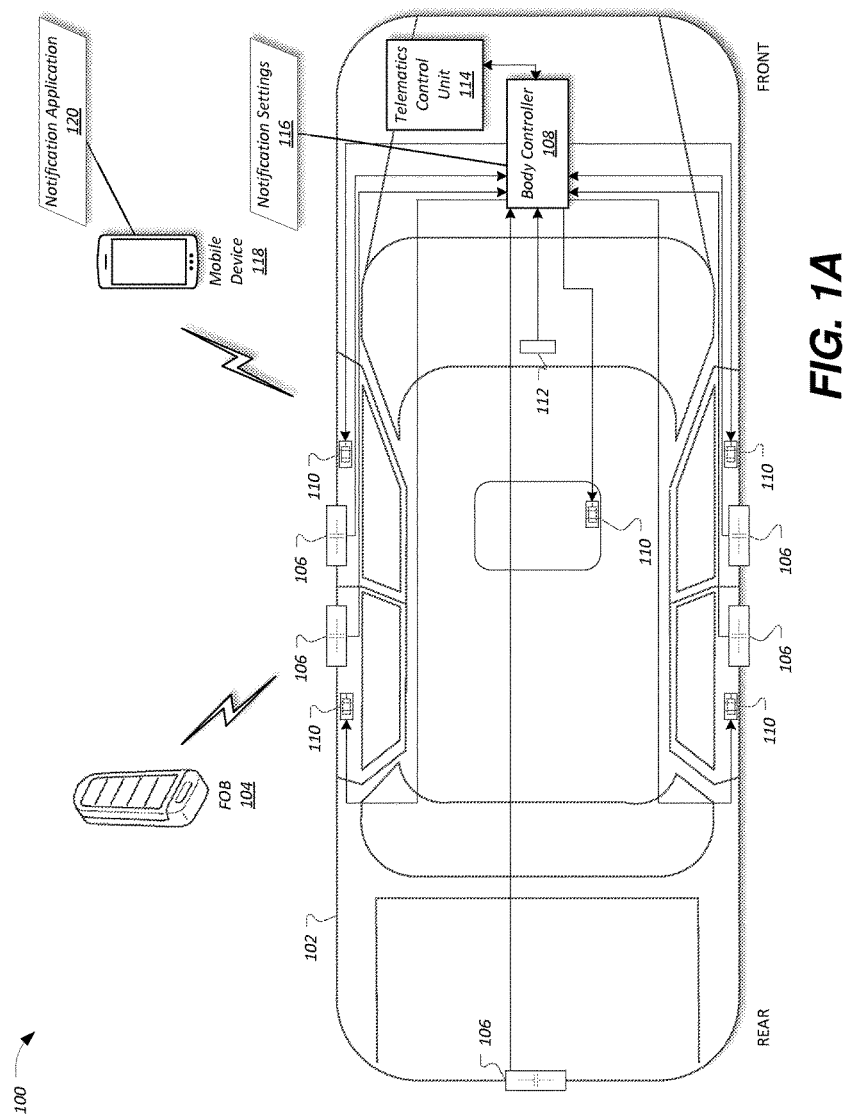
FIG. 1A illustrates an example system of a vehicle for rain detection and window, sunroof or vent closure.

FIG. 1 illustrates an example system 100 of a vehicle 102 for rain detection and window, sunroof or vent closure. The system 100 may include aspects of a passive keyless entry/ passive start (PEPS) system for rain detection, aspects of a power window system to provide for window closure (e.g., closure of front and rear door power windows, powered window side vents, power sunroofs and moon-roofs, as some examples), and aspects of a telematics system for user notification and configuration. The system 100 may take many different forms and includes multiple and/or alternate components and facilities. While an example system 100 is shown in FIG. 1, the example components illustrated of the system 100 are not intended to be limiting. Indeed, additional or alternative components and/or implementations may be used.

In a PEPS system, a user may carry an electronic transmission device, such as a PEPS key fob 104, to allow for "keyless" entry to the vehicle 102. To initiate a door unlock sequence, the user may touch or move in close proximity to a PEPS handle capacitive sensor 106 of a vehicle 102 door handle. Upon on an identification of the potential presence of a user by a capacitive sensor 106, a controller 108 of the vehicle 102 may initiate a challenge-accept sequence with the key fob 104. The sequence may include the controller 108 sending a low-frequency message to the key fob 104, and listening for a high-frequency response from the key fob 104 including an identification code. Upon receipt of the correct identification code, the vehicle controller 108 may unlock the vehicle 102 doors.

A vehicle 102 equipped with PEPS capacitive sensors 106 may have multiple capacitive sensors 106 on each door handle. For example, door handles may each have a capacitive sensor 106 for a locking function and a second capacitive sensor 106 for an unlocking function. A vehicle deck lid or tailgate may, typically, only have an unlock capacitive sensor 106. As another example, capacitive sensors 106 may include capacitive keypads utilized on some vehicles 102 to facilitate vehicle 102 entry upon receiving a correct key code entered into the keypad. Still other types of vehicle 102 capacitive sensors 106 may also be utilized by the system 100, such as any other exterior capacitive sensors that may be used for keyless entry purposes, such as lock/unlock, unlatch, or keypad operations.

The controller 108 may be configured to receive capacitive values from the capacitive sensors 106, and to identify a baseline level of capacitance. This may be done, for example, according to an average of the values received from the sensors, or according to data received from other environmental sensors of the vehicle 102. The baseline level of capacitance may drift up or down based on various environmental conditions, such as changes in air temperature or humidity. If the controller 108 detects a substantial change from the baseline level of capacitance during a relatively short period of time, the controller 108 may determine the potential presence of a user. For instance, the capacitive sensors 106 may detect a change of capacitance based on an approaching presence of a human hand. Capacitive sensors 106 such as PEPS handle sensors 106 and keypad capacitive sensors 106 may also be sensitive to the onset of moisture. As such, the capacitive sensors 106 may be considered rain sensors sensitive to detection of a rain condition.

A vehicle 102 equipped with PEPS system may include one or more capacitive sensors 106 on each of a plurality of door handles, resulting in an array of sensors 106 that may be used for the detection of rain. For example, a vehicle 102 including two capacitive sensors 106 on each of four doors may be considered to have an array of eight rain sensors, while a vehicle 102 with two capacitive sensors 106 on the front two doors may be considered to have an array of four sensors. Further, on some vehicles 102 with a capacitive trunk release, the rear trunk release sensor 106 could allow for an array of nine rain sensors 106 on a four-door sedan or an array of five rain sensors 106 on a two-door sedan. Other vehicles 102 may include different arrays of capacitive sensors 106, such as keypad capacitive sensors 106 to unlock associated vehicle doors. Nevertheless, since PEPS keyless entry systems may be standard on many vehicles 102, and since the PEPS handle capacitive sensors 106 may be active when the vehicle 102 is off to facilitate keyless entry, use of the PEPS handle capacitive sensors 106 for rain detection provides the controller 108 with an array of capacitive sensors 106 that may be free of both incremental part cost and incremental KOL.

The controller 108 may be configured to receive sensor data from the PEPS handle capacitive sensors 106 indicative of relative levels of capacitance. These inputs to the controller 108 from the PEPS capacitive handle sensors 106 may be utilized to identify the onset of a rain condition. For example, if sensor data received from two or more capacitive sensors 106 includes relatively simultaneous changes in capacitance, and further, if the vehicle is locked, that no key fob 104 is detected by the controller 108 as being within the proximity of the exterior challenge zone of a door handle and, if the vehicle is unlocked, that there is an absence of a door opening occurrence within a prescribed time period after the detected change in capacitance, the controller 108 may conclude that there has been an onset of a rain condition. As another example, if sensor data received from at least one capacitive sensor 106 per door handle registers a detection of a change in capacitance which is not followed by a door opening occurrence for a door corresponding to the at least one capacitive sensor 106, then the controller 108 may conclude that there has been an onset of a rain condition.

In some cases, the controller 108 may implement a two-stage process to determine the onset of a rain condition. For example, based on receiving a change in capacitance from a PEPS handle capacitive sensor 106, in the absence of detection of a PEPS key fob 104 handle in proximity of the sensor 106 or a door opening occurrence, the system 100 may wake the vehicle 102 and look for secondary signs of rain before concluding that a rain condition exists. As some examples of secondary signs, the controller 108 may: activate a smart-wipe rain sensor 112 to identify whether the windshield appears wet, activate connectivity to a local weather information source via telematics control unit 114 to determine whether rain is predicted (e.g., discussed in more detail with respect to FIG. 1B), use an onboard vehicle 102 humidity sensors to determine whether humidity levels are indicative of rain, compare lock and unlock capacitive sensors 106 on a given door handle for sensor data 202 confirming the rain condition, compare readings from other capacitive sensor 106 locations of the vehicle 102 for sensor data 202 confirming the rain condition, or use onboard vehicle 102 sun load sensors to identify the sun load presented to the vehicle 102. As a more specific example, the sun load sensors may be used to exclude capacitive sensor 106 data otherwise indicative of a window closure in the case of sun load values that are inconsistently high for a true rain condition. However, use of sun load sensors for confirmation of a rain condition may be limited to use during certain time periods, e.g., day time as determined according to onboard vehicle 102 date and time information, potentially supplemented by location information available to the vehicle (e.g., according to a navigation system or global positioning system receiver).

Upon determining a reasonable probability of rain, the controller 108 may be configured to take various actions. For example, the controller 108 may be configured to provide indications to power window actuators 110 configured to cause the various windows (e.g., front and rear door power windows, powered window side vents, power sunroofs and moon-roofs) of the vehicle 102 to close, thereby preventing the rain from entering the vehicle 102. In some cases, the controller 108 may identify that the vehicle doors are locked and that the closed vehicle window was previously open greater than a predefined window threshold (e.g., to facilitate access to the vehicle cabin). In such a case, the controller 108 may unlock at least one of the vehicle doors (e.g., the door whose window was closed) to maintain access to the vehicle 102. As another example, the controller 108 may be configured to alert the vehicle 102 user of rain and request confirmation from the user to close the windows. The alert may be sent to the user, for example, to a mobile device 118 of the user via a telematics control unit 114 of the vehicle 102.

In some examples, the controller 108 may be further configured to determine a conclusion of the rain condition. For example, similar to the determination of the onset of a rain condition, the controller 108 may detect a reverse change or a return in a level of capacitance to a baseline level of capacitance. Upon a determination of the end of a rain condition, the controller 108 may be configured to take various additional actions. For example, the controller 108 may be configured to cause the windows of the vehicle 102 to reopen. For vehicles 102 that support the reporting of windows position information, the controller 108 may be configured to reopen the windows by recording a position of the windows before closure, and returning the windows to the recorded position upon detection of the conclusion of the rain condition. For vehicles 102 that do not support the reporting of windows position information, the controller 108 may, for example, record an amount of time taken to close a window, and may provide a reopen command to the window for the recorded amount of time upon detection of the conclusion of the rain condition.

The actions performed by the vehicle 102 when rain is detected or when the conclusion of rain is detected may be based on notification settings 116 of the vehicle 102. The notification settings 116 may include, as some non-limiting examples, whether rain auto close functionality should be enabled, if it is enabled, whether to send alerts to the user, whether to require confirmation of alerts before performing close actions, which specific windows to close, geographical differences in behavior, differences in behavior based on which key fob 104 was most recently used, differences in behavior based on which mobile device 118 was most recently connected to the telematics control unit 114, and settings with respect to reopening of windows after the rain condition is concluded.

The notification settings 116 may be maintained by the controller 108 and may be accessible to the telematics control unit 114 over the vehicle controller area network (CAN) bus. In another example, the notification settings 116 may be maintained in another storage device of the vehicle 102, such as in a memory of telematics control unit 114.

The telematics control unit 114 may be configured to provide telematics services to the vehicle 102. These services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. To support these and other telematics service, the telematics control unit 114 may utilize network hardware configured to facilitate communication between the vehicle ECUs, such as the controller 108, and with other devices of the system 100. In an example, the telematics control unit 114 may interface with a wireless transceiver configured to communicate over one or more of Bluetooth, Wi-Fi, and wired USB with the mobile device 118 of a user.

The mobile device 118 may undergo a process the first time the mobile device 118 is connected to the telematics control unit 114, in which the telematics control unit 114 scans for mobile devices 118, and the user manually confirms an identification of the mobile device 118 to be connected to the telematics control unit 114. This process may be referred to as pairing. The telematics control unit 114 may maintain paired device data indicating device identifiers or other information regarding mobile devices 118 that have been previously paired with the telematics control unit 114. Accordingly, once the pairing process is performed, the telematics control unit 114 may utilize the paired device data to automatically reconnect to the mobile device 118 when the mobile device 118 is identified via the wireless transceiver as being in proximity of the telematics control unit 114. The telematics control unit 114 may further maintain an indication of the mobile device 118 that is most recently paired to the telematics control unit 114.

Figure 1B:
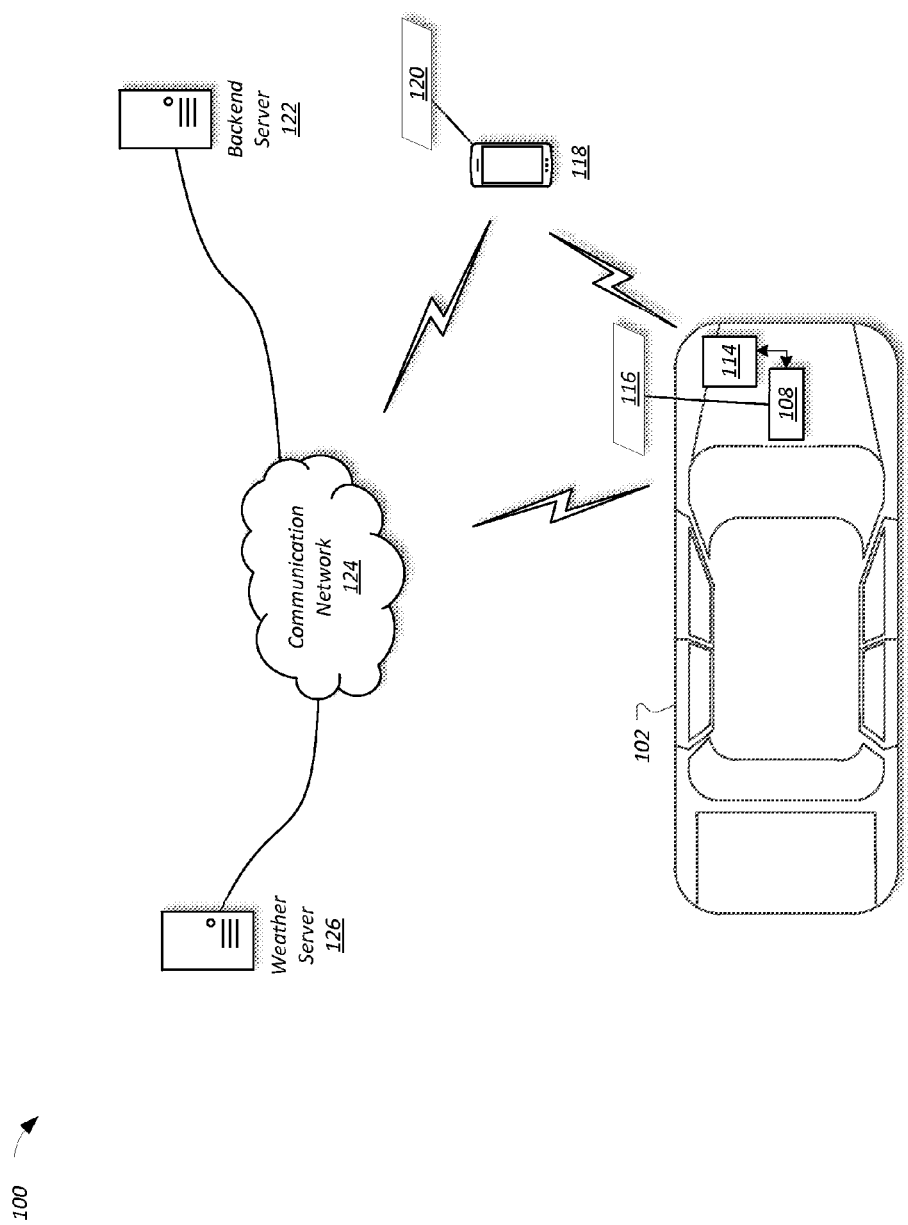
FIG. 1B illustrates an example system for using information from a weather service to aid in rain condition determination.

The mobile devices 118 may be any of various types of portable computing device, such as cellular phones, tablet computers, smart watches, laptop computers, portable music players, or other devices capable of communication over a communications network (e.g., the communication network 124 shown in FIG. 1B). In an example, the mobile devices 118 may communicate with the communication network 124 via a wireless transceiver of the mobile device 118. The mobile devices 118 may include one or more processors configured to execute instructions of mobile applications loaded to a memory of the mobile device from storage medium of the mobile device 118.

The notification application 120 may be an example of a mobile application installed to the mobile device 118. The notification application 120 may be configured to receive input (e.g., user input to a user interface of the mobile device 118), and communicate with the vehicle 102 via the telematics control unit 114, as discussed in greater detail below. In particular, the notification application 120 may be used by users to configure the notification settings 116 of the vehicle 102, receive rain alerts from the vehicle 102, and provide confirmations of the received alerts to the vehicle 102.

FIG. 1B illustrates an example system 100 for using information from a weather service 126 to aid in rain condition determination. As shown, the portion of the system 100 may include the weather service 126 and a backend server 122 in communication with the vehicle 102 over the communication network 124. The weather service 126 may be configured to provide information regarding forecasted weather conditions, and the backend server 122 may be configured to maintain location, window state or other information about the vehicle 102 that may be used to aid in rain determinations based on the forecasted weather conditions of the weather service 126.

In an example, periodically or based on a trigger such as vehicle 102 parking or vehicle 102 key off, the telematics control unit 114 of the vehicle 102 may send a current global positioning location of the vehicle 102 and the current windows status (e.g., which windows/vents/roofs are open) to the backend server 122 over the communication network 124. Additionally or alternatively, the telematics control unit 114 may send to the backend server 122 information indicative of whether the vehicle 102 is identified as being parked outside or inside (e.g., determined based on onboard vehicle 102 sun load sensors to identify the sun load presented to the vehicle 102, based on the current location being associated with a garage or other indoor structure).

The backend server 122 may be configured to maintain the information received from the vehicles 102. The backend server 122 may be further configured to access the weather service 126 to periodically or otherwise check the weather forecast for the maintained locations of the vehicles 102. When the weather forecast indicates a potential for rain, the backend server 122 may be configured to optionally send a notification to the mobile device 118 of the driver for instructions, e.g. close windows now, close right before rain, etc. When the weather service notifies about approaching rain the backend server 122 may sends an alert or other communication to the vehicle 102 to perform rain auto close actions. Alternatively, the message to the vehicle 102 may cause the vehicle 102 to activate the smart-wipe rain sensor 112 to confirm the rain condition before triggering rain auto close actions.

Figure 2:
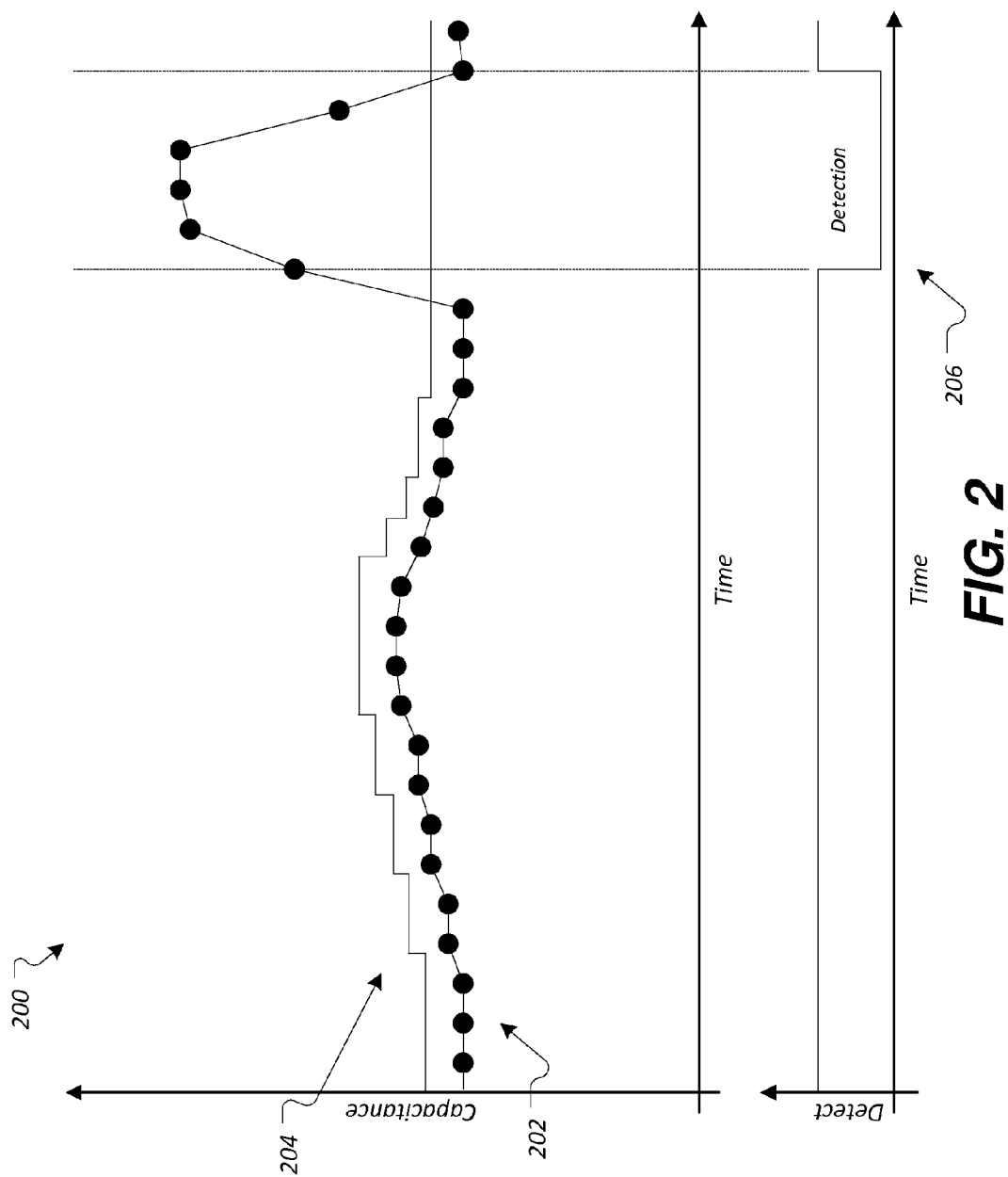
FIG. 2 illustrates an example detection of a sudden rain condition using sensor data from a capacitive sensor and a detection threshold.

FIG. 2 illustrates an example detection of a sudden rain condition using sensor data 202 from a capacitive sensor 106 and a detection threshold 204. The sensor data 202 may include data periodically sampled from a PEPS capacitive sensor 106. The controller 108 may receive the raw sensor data 202, and may identify whether the received sensor data 202 changes in value beyond that of the detection threshold 204. In some examples the sensor 106 may process and assess capacitive changes and only report sudden changes to the controller 108. The detection threshold 204 may be set, in some examples, to be a predetermined distance above the current sensor data 202, or to be a predetermined distance above an average of the most recent samples of the sensor data 202. In some examples, the controller 108 may set the threshold level in the sensor or in controller 108 memory based at least in part on vehicle 102 specific information programmed into the vehicle 102 (e.g., during assembly) to compensate for different vehicle body styles and handle styles in which a common handle capacitive sensor 106 may be utilized. In some cases, the detection threshold 204 may be the threshold used to determine a potential presence of a user by the capacitive sensor 106. If the controller 108 determines that the received sensor data 202 has changed in value beyond that of the detection threshold 204, then the controller 108 may identify that the sensor data 202 is indicative of the onset of a rain condition.

If the controller 108 instead determines that the received sensor data 202 has changed in value without triggering the detection threshold 204, then the controller 108 may selectively adjust the detection threshold 204 according to the new sample. Accordingly, the controller 108 may be able to selectively adjust the detection threshold 204 to account for changes in humidity and temperature, thereby maintaining a relative detection threshold 204 as an offset change in capacitance.

Moreover, if the controller 108 determines that the received sensor data 202 has changed in value back below the detection threshold 204, then the controller 108 may identify the conclusion of the rain condition.

Figure 3:
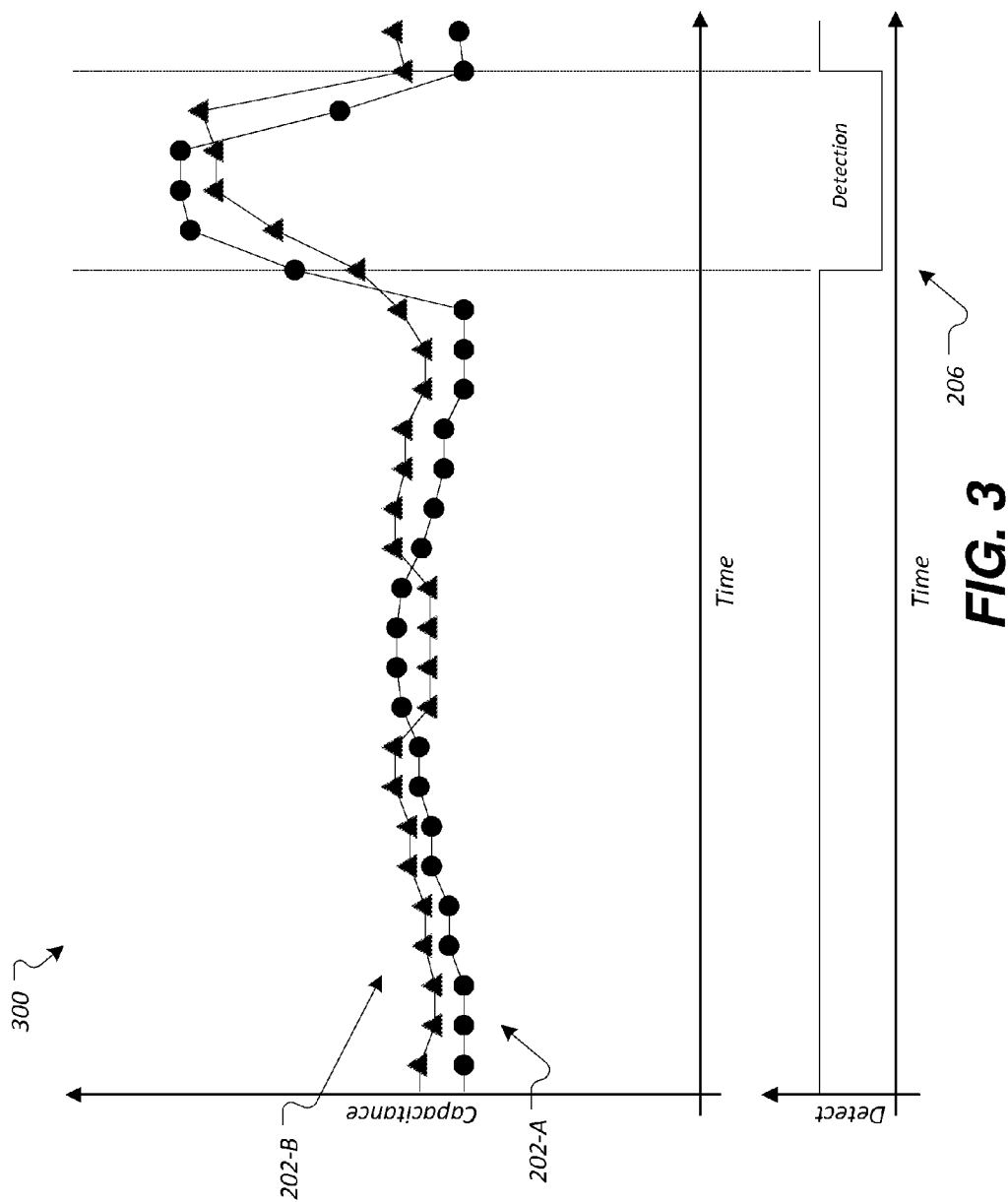
FIG. 3 illustrates an example detection of a rain condition using sensor data from a plurality of capacitive sensors.

FIG. 3 illustrates an example detection of a rain condition using sensor data 202 from a plurality of capacitive sensors 106. As illustrated, the sensor data 202-A may include data periodically sampled from a first PEPS capacitive sensor 106-A, while the sensor data 202-B may include data periodically sampled from a second PEPS capacitive sensor 106-B. The controller 108 may receive the sensor data 202-A and 202-B, and may identify a rain condition based on identification of a substantially simultaneous or otherwise relatively consistent change across the sensor data 202-A and 202-B in the absence of a door opening occurrence. As shown, based on an identification of a relatively large change in capacitance in the sensor data 202-A and also in the sensor data 202-B, the controller 108 identifies an indication of a rain condition. Moreover, based on a further determination that the received sensor data 202-A and 202-B have each changed in value back to a baseline level of capacitance, the controller 108 may further identify a conclusion of the rain condition.

It should be noted that variations on the example capacitive measurements and use of this information to determine the onset of rain conditions are possible. For instance, while capacitive measurements includes a detection of a rain condition using two PEPS capacitive sensors 106, it should be noted that greater numbers of capacitive sensors 106 may be utilized as well. Moreover it should further be noted that use of detection thresholds 204 as described with respect to FIG. 2 may further be utilized with respect to multiple sensors 106 as described with respect to FIG. 3.

Figure 4A:
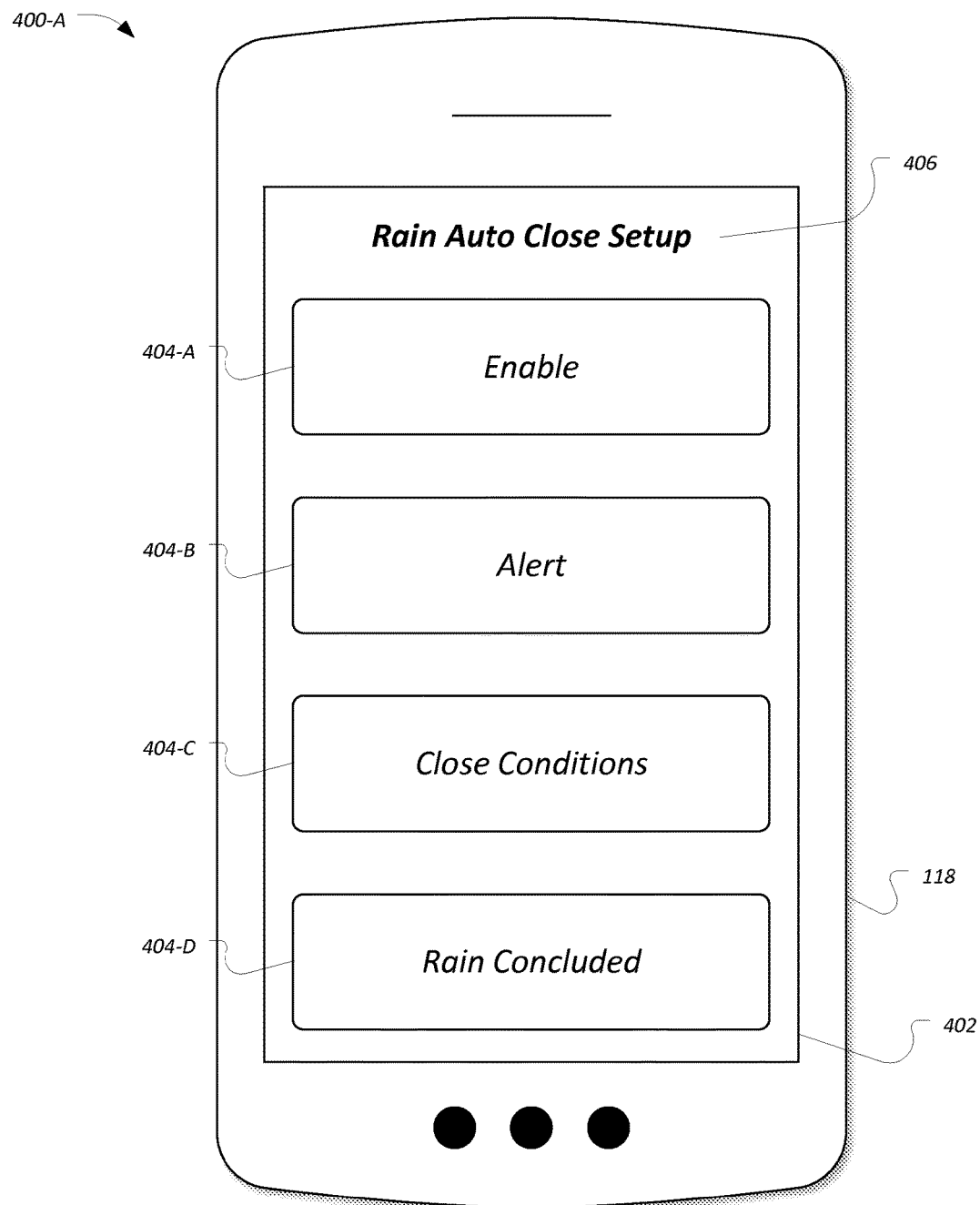
FIG. 4A illustrates an example user interface of the notification application displaying a main menu for configuration of the notification settings.

FIG. 4A illustrates an example user interface 400-A of the notification application 120 displaying a main menu for configuration of the notification settings 116. As shown, the user interface 400-A may be presented by notification application 120 on a display 402 of the mobile device 118, and may include a list of selectable menu items 404-A through 404-D (collectively 404) of notification application 120 features. Each of the selectable menu items 404 may indicate a category of notification settings 116. The user interface 400-A may also include a title label 406 to indicate to the user that the user interface 400 is displaying a menu of options of the notification application 120.

As illustrated, the main menu includes a menu item 404-A for an enable submenu, a menu item 404-B for an alert submenu, a menu item 404-C for a close-conditions submenu, and a menu item 404-D for a rain-concluded submenu. In some cases, the menu items 404 may be displayed on a touch screen such that the user may be able to touch the menu item 404 to select and invoke the associated functions. As another example, the user interface 400-A may support voice command selection of the menu items 404. For example, to invoke the alert submenu, the user may speak the voice command "Alert." It should be noted that the illustrated menu items 404 are merely examples, and more or different submenus or arrangements of options may be available.

Figure 4B:
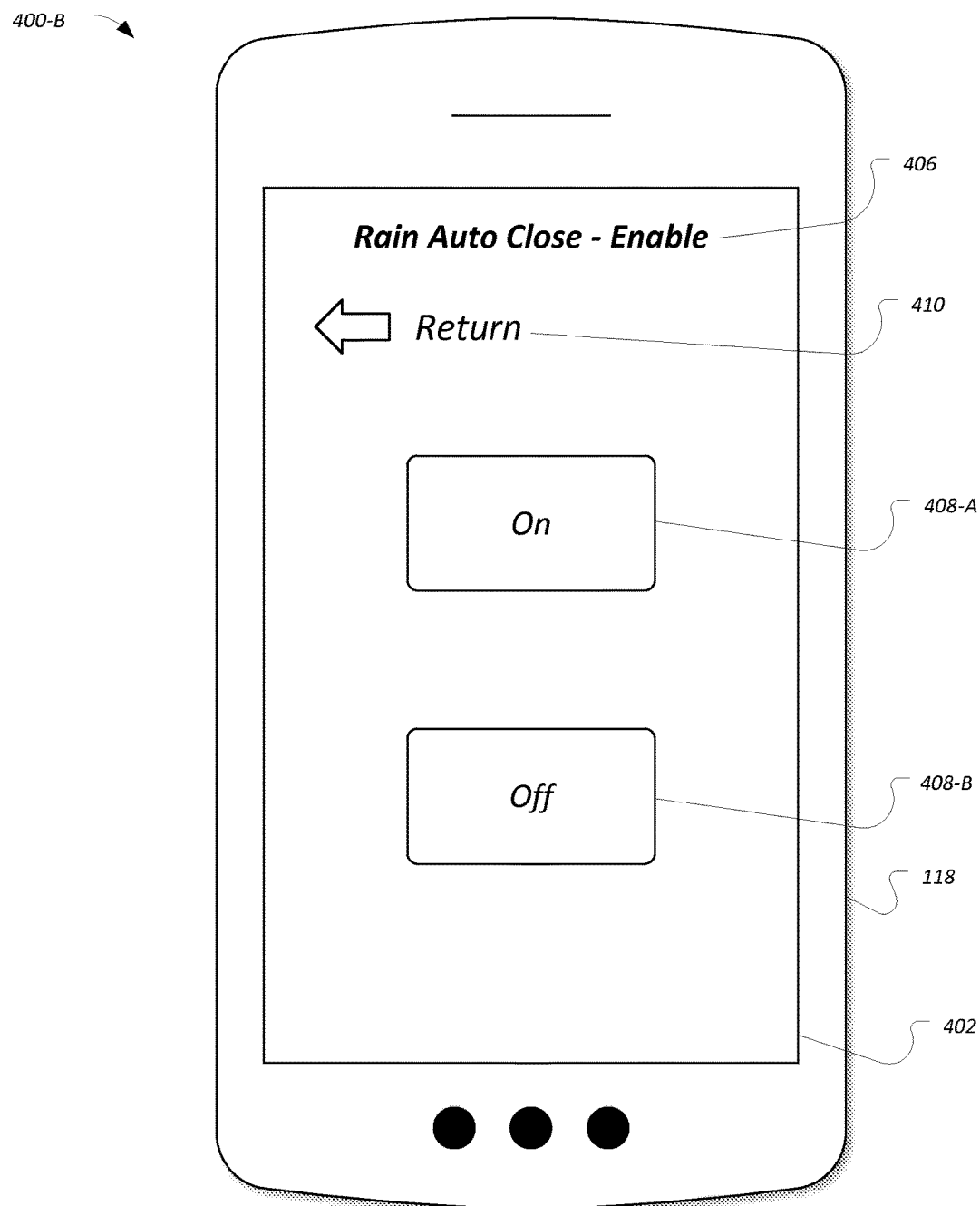
FIG. 4B illustrates an example user interface of the notification application displaying the enable submenu.

FIG. 4B illustrates an example user interface 400-B of the notification application 120 displaying the enable submenu. As with the user interface 400-A, the user interface 400-B may also be presented by the notification application 120 on the display 402 of the mobile device 118. The user interface 400-B may be invoked, in an example, responsive to user selection of the menu item 404-A of the user interface 400-A. As compared to the user interface 400-A, the title label 406 may indicate to the user that the user interface 400-B is displaying the enable submenu of the notification application 120. Moreover, rather than the main menu items 404, the user interface 400-B may include an enable button 408-A that, when selected by the user, is configured to cause the notification application 120 to update the notification settings 116 to indicate that rain auto close functionality is to be enabled by the controller 108 and a disable button 408-B that, when selected by the user, is configured to cause the notification application 120 to update the notification settings 116 to indicate that rain auto close functionality is to be disabled by the controller 108. Thus, the user may be able to use the enable submenu to enable or disable the rain auto close functionality, without disturbing other settings of the system 100. The user interface 400-B may also include a return to menu button 410 that, when selected by the user, is configured to cause the notification application 120 to return to display of the main menu user interface 400-A.

Figure 4C:
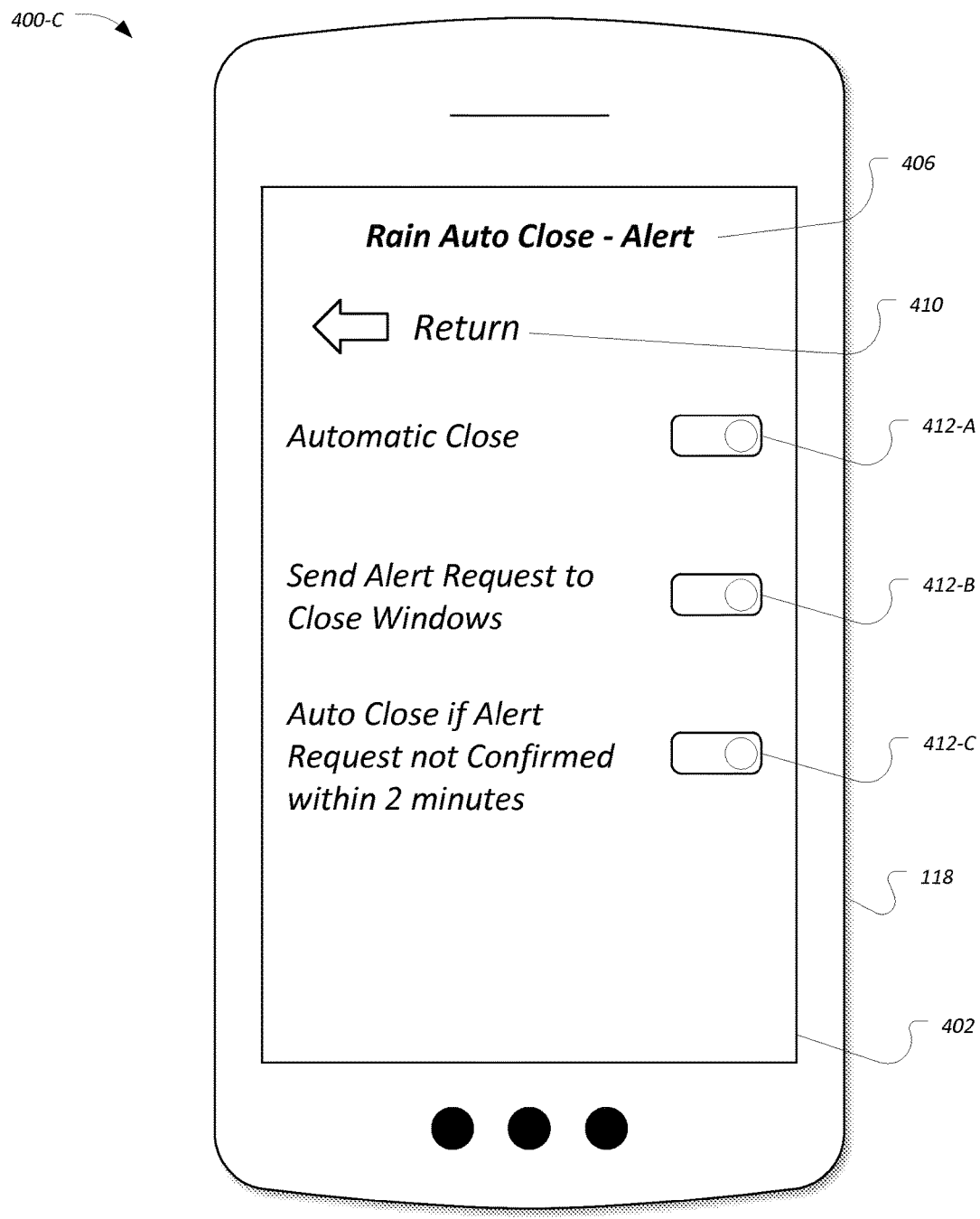
FIG. 4C illustrates an example user interface of the notification application displaying the alert submenu.

FIG. 4C illustrates an example user interface 400-C of the notification application 120 displaying the alert submenu. As with the user interfaces 400-A and 400-B, the user interface 400-C may also be presented by the notification application 120 on the display 402 of the mobile device 118. The user interface 400-C may be invoked, in an example, responsive to user selection of the entry 406-B of the user interface 400-A. The title label 406 may indicate to the user that the user interface 400-B is displaying the alert submenu of the notification application 120.

The alert submenu may include options that, when selected by the user, cause the notification application 120 to update the notification settings 116 related to the vehicle 102 providing alerts to the mobile device 118 when a rain condition is identified by the controller 108. For example, the alert submenu may include: a control 412-A that allows the user to select whether the automatic close functionality is enabled or not, a control 412-B that allows the user to select whether or not alerts are to be sent to the mobile device 118 when a rain condition is identified by the controller 108, and a control 412-C that allows the user to select whether or not auto close functionality should be performed if the user does not respond to confirm the alert within a predetermined period of time (e.g., within two minutes).

The user interface 400-C may also include the return to menu button 410 that, when selected by the user, is configured to cause the notification application 120 to return to display of the main menu user interface 400-A.

Figure 4D:
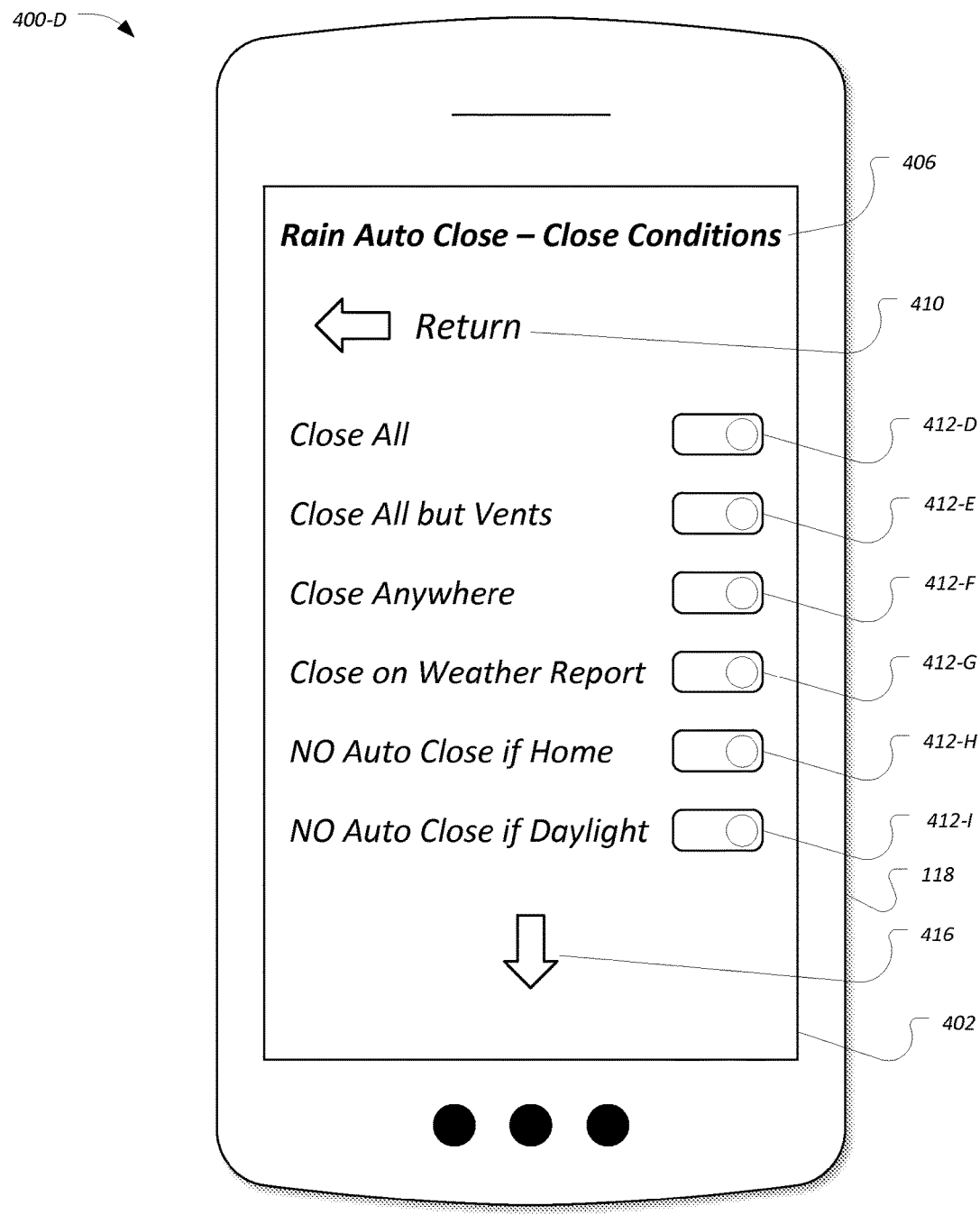
FIGS. 4D and 4E illustrate an example user interface of the notification application 120 displaying the close-conditions submenu.
Figure 4E:
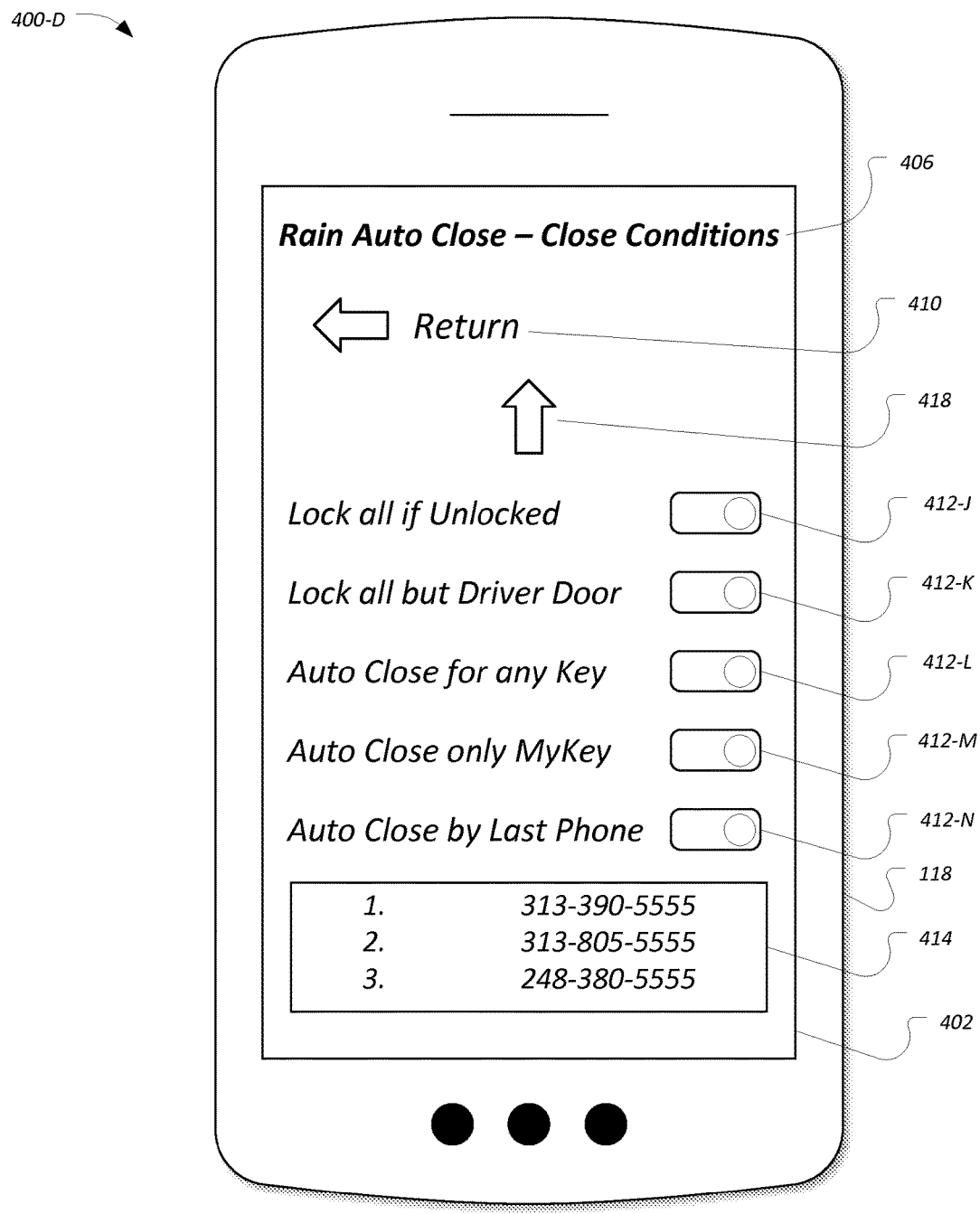

FIGS. 4D and 4E illustrate an example user interface 400-D of the notification application 120 displaying the close-conditions submenu. As with the user interfaces 400-A through 400-C, the user interface 400-D may also be presented by the notification application 120 on the display 402 of the mobile device 118. The user interface 400-D may be invoked, in an example, responsive to user selection of the entry 406-C of the user interface 400-A. The title label 406 may indicate to the user that the user interface 400-B is displaying the close-conditions submenu of the notification application 120.

The close-conditions submenu may include options that, when selected by the user, cause the notification application 120 to update the notification settings 116 related to the vehicle 102 providing alerts to the mobile device 118 when a rain condition is identified by the controller 108. For example, the close-conditions submenu may include: a control 412-D that allows the user to select to close all vehicle 102 openings when rain is detected, a control 412-E that allows the user to select to close all vehicle 102 openings except vents when rain is detected, a control 412-F that allows the user to select to close the vehicle 102 openings regardless of vehicle 102 location, a control 412-G that allows the user to select to close the vehicle 102 openings responsive to the vehicle 102 receiving a weather report indicating rain (i.e., from the weather server 126 using the telematics control unit 114, as a confirmation of or in other cases without direct rain detection by the controller 108 using data from the capacitive sensors 106), a control 412-H that allows the user to select for the vehicle 102 to not close vehicle 102 openings when at a home location of the vehicle 102, and a control 412-I that allows the user to select for the vehicle 102 to not close vehicle 102 openings during daylight hours.

Referring to FIG. 4E, the close-conditions submenu may also include: a control 412-J that allows the user to select to lock all vehicle 102 doors when rain is detected, a control 412-K that allows the user to select to lock all vehicle 102 doors except for the driver door (e.g., to avoid the driver being locked out upon window closure), a control 412-L that allows the user to select for automatic close functionality to be enabled for any key fob 104, a control 412-M that allows the user to select for the automatic close functionality to be enabled for only a specific key fob 104 of the user, and a control 412-N that allows the user to select for the automatic close functionality to be enabled for parked vehicles that have most recently been paired with one of a listing of mobile devices 118. The user interface 400-C may also include a device listing control 414 that the user may utilize to include identifiers of mobile devices 118 that, when recently paired to the telematics control unit 114, cause the auto close functionality to be enabled. In some cases, the device listing control 414 may be populated with paired device data from the telematics control unit 114.

As the close-conditions submenu may include more controls 412 than may be included on the display 402 at one time, the user interface 400-D may include a scroll down control 416 (e.g., shown in FIG. 4D) and a scroll up control 418 (e.g., shown in FIG. 4E) to allow the user to navigate the user interface 400-D to display the available controls. The user interface 400-D may also include the return to menu button 410 that, when selected by the user, is configured to cause the notification application 120 to return to display of the main menu user interface 400-A.

Figure 4F:
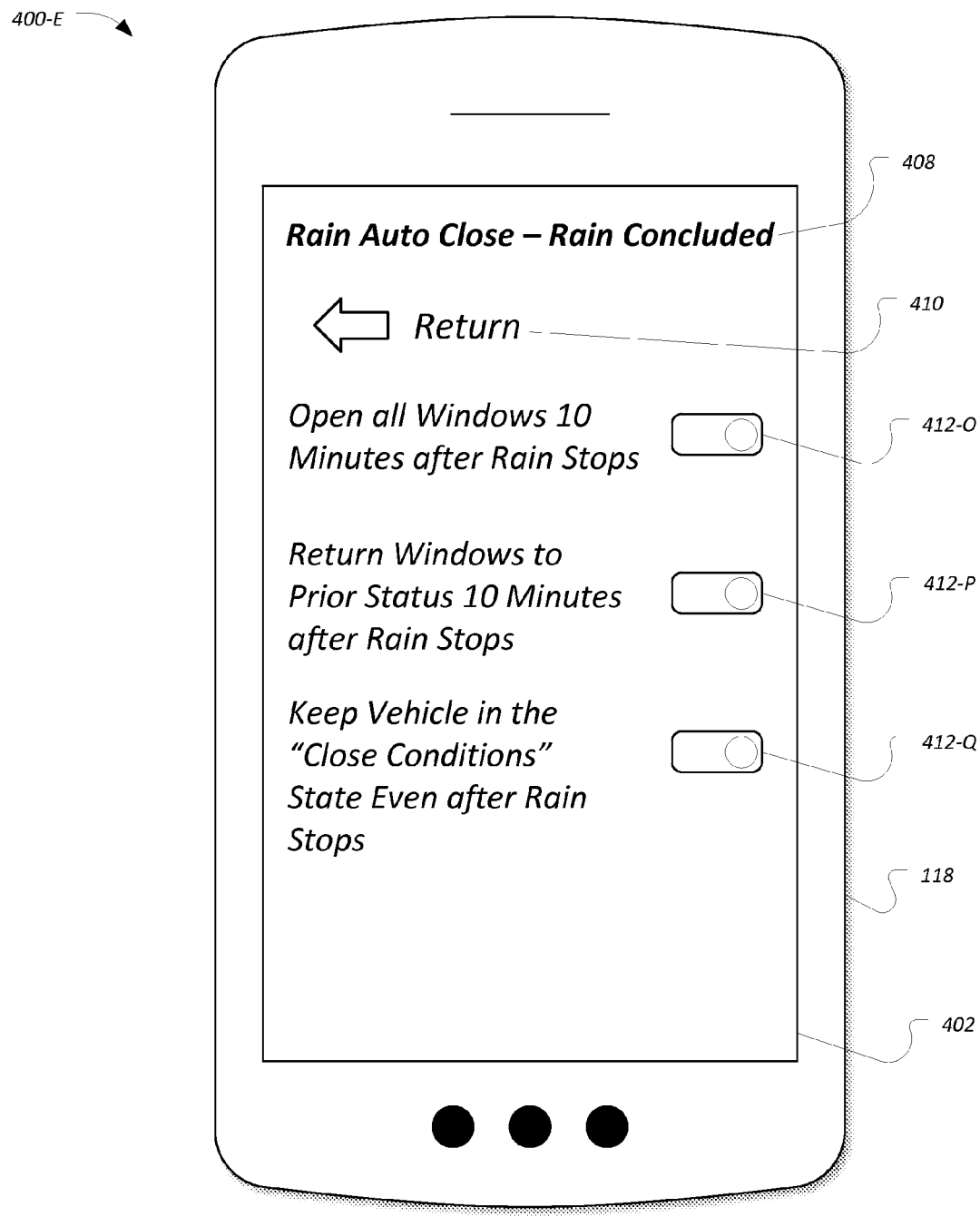
FIG. 4F illustrates an example user interface of the notification application displaying the rain-concluded submenu.

FIG. 4F illustrates an example user interface 400-E of the notification application 120 displaying the rain-concluded submenu. As with the user interfaces 400-A through 400-D, the user interface 400-E may also be presented by the notification application 120 on the display 402 of the mobile device 118. The user interface 400-E may be invoked, in an example, responsive to user selection of the entry 406-D of the user interface 400-A. The title label 406 may indicate to the user that the user interface 400-D is displaying the rain-concluded submenu of the notification application 120.

The rain-concluded submenu may include options that, when selected by the user, cause the notification application 120 to update the notification settings 116 related to actions to be performed by the vehicle 102 when a rain condition is no longer identified by the controller 108. For example, the rain-concluded submenu may include: a control 412-O that allows the user to select for the controller 108 to open vehicle 102 openings upon a predetermined amount of time passing after rain has concluded (e.g., 10 minutes after); a control 412-P that allows the user to select for the controller 108 to return vehicle 102 openings to whatever state they were in before being automatically closed, upon a predetermined amount of time passing; and a control 412-Q that allows the user to select for the controller 108 to leave the openings closed despite the rain having concluded.

The user interface 400-E may also include the return to menu button 410 that, when selected by the user, is configured to cause the notification application 120 to return to display of the main menu user interface 400-A.

Although the user interfaces 400-A through 400-E for configuration of the notification settings 116 are described as being displayed to the user via the notification application 120 being executed on the mobile device 118 of the user, configuration of the notification settings 116 may additionally or alternately be performed using the vehicle 102.

Figure 5A:
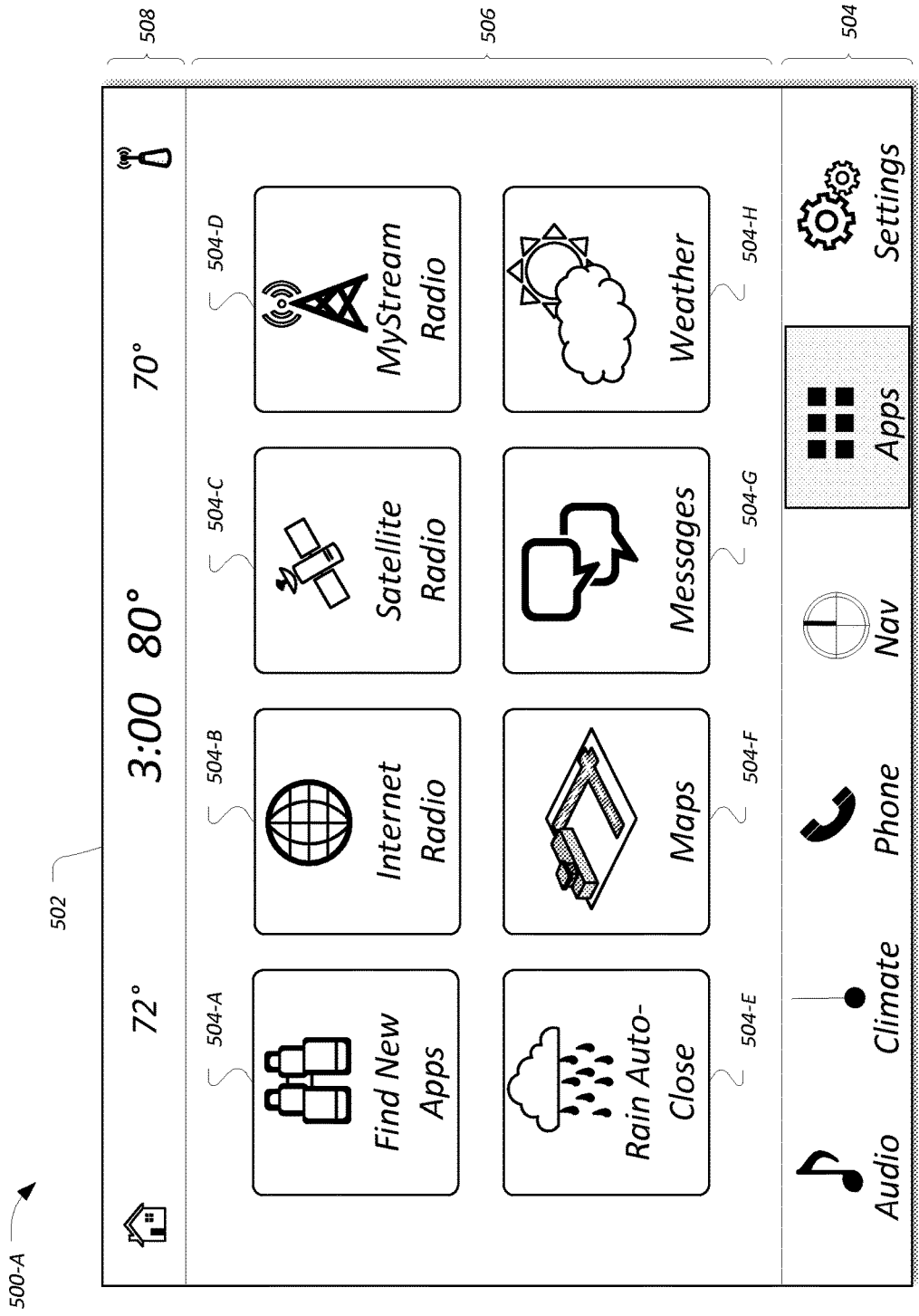
FIG. 5A illustrates an example user interface for selection of applications for use on a head unit display of the vehicle.

FIG. 5A illustrates an example user interface 500-A for selection of applications for use on a head unit display 502 of the vehicle 102. The head unit display 502 may be driven, for example, by a video connection to the telematics control unit 114 of the vehicle 102. The user interface 500-A may include a category listing 504 of one or more screen of content to be displayed in the main screen area 506 of the head unit display 502. As some examples, the category listing 504 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 502 may be accessed. The user interface 500-A may also include a general information area 508 from which time, current temperature, and other information may remain visible to the user, regardless of the specific screen or application that is active in the main screen area 506.

As shown, the applications screen is illustrated as selected from the category listing 504, and the main screen area 506 is illustrated as showing a listing of available applications that may be invoked. These applications may include, for example, a find new apps application item 510-A, an internet radio item 510-B, a satellite radio item 510-C, a streaming radio item 510-D, an icon 510-E for selection of the notification application 120, a maps item 510-F, a messages icon 510-G, and a weather icon 510-G.

Figure 5B:
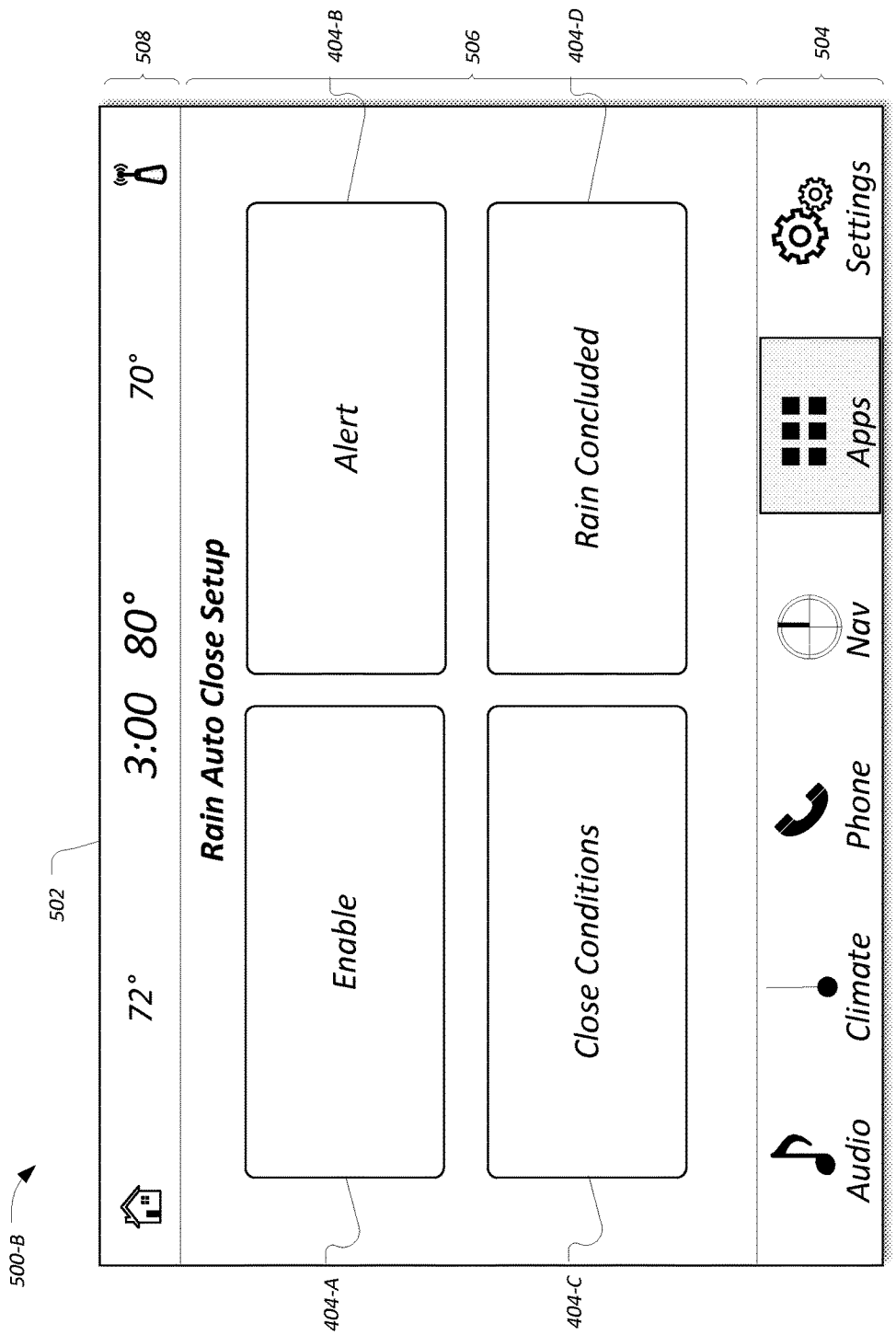
FIG. 5B illustrates an example user interface of the notification application displaying a main menu for configuration of the notification settings on a head unit display of the vehicle.

FIG. 5B illustrates an example user interface 500-B of the notification application 120 displaying a main menu for configuration of the notification settings 116. The user interface 500 may further be able to display and allow for configuration using any of the submenus and options described above with respect to the user interfaces 400-B through 400-E. Thus, similar to the user interface 400-A, the user interface 500-B may be used to select the various notification settings 116 screens of the notification application 120, but using the head unit display 502 of the vehicle 102 rather than the display 402 of the mobile device 118.

Whether set up using the mobile device 118 or the head unit display 502, the notification settings 116 may be utilized by the controller 108 to perform rain detection and any indicated actions.

Figure 6A:
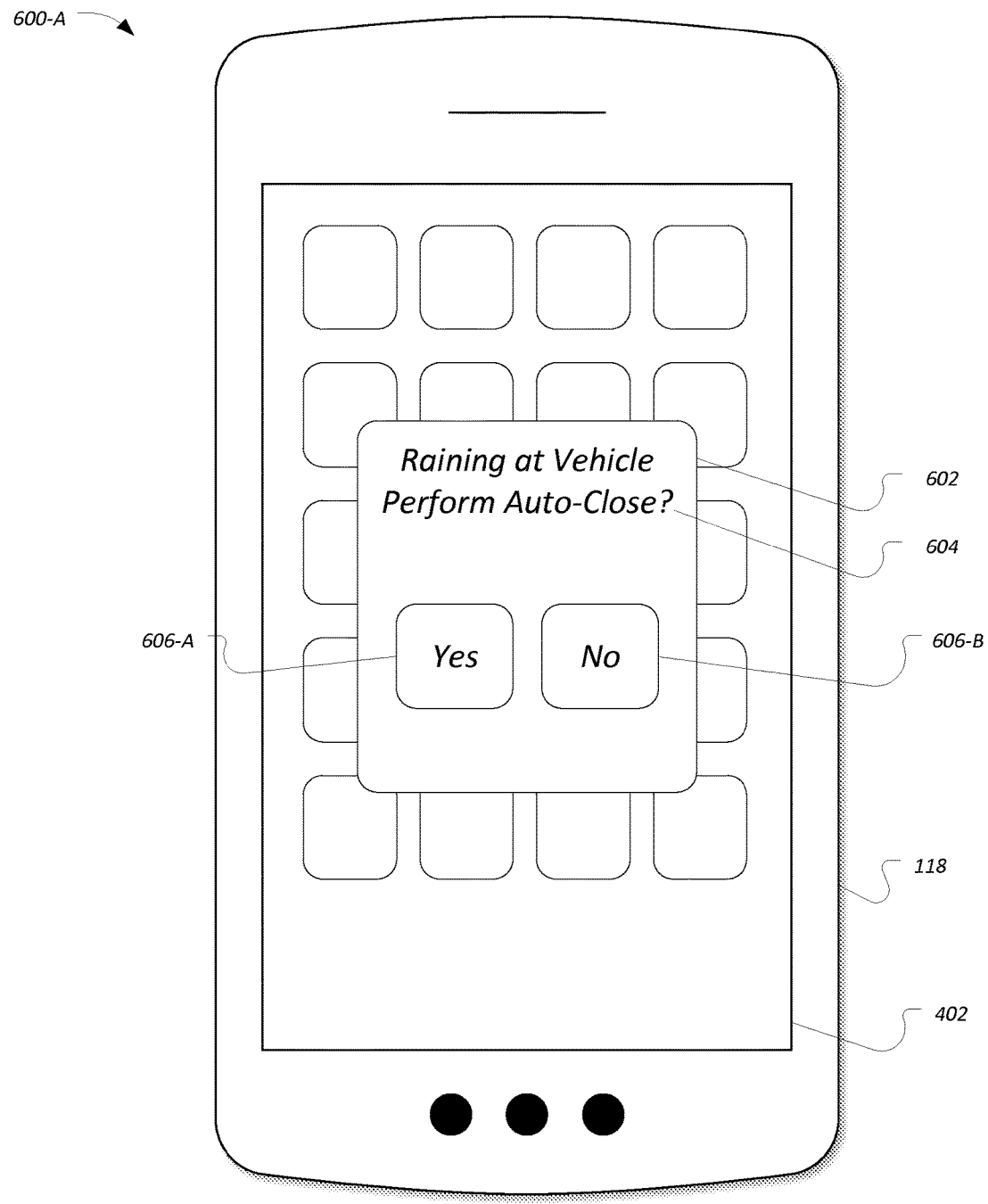
FIG. 6A illustrates an example user interface illustrating an alert displayed on the display of the mobile device.

FIG. 6A illustrates an example user interface 600-A illustrating an alert 602 displayed on the display 402 of the mobile device 118. The alert 602 may be displayed by the notification application 120, for example, responsive to receipt of a message by the mobile device 118 sent from the telematics control unit 114 of the vehicle 102 based on detection of rain performed by the controller 108 of the vehicle 102.

As shown, the alert 602 may include a title label 604 to indicate to the user that the alert 602 indicates the presence of rain at the vehicle 102. The alert 602 may further include a confirm button 606-A that, when selected by the user, is configured to cause the notification application 120 to send an alert response message to the vehicle 102 to indicate that rain auto close actions specified by the notification settings 116 are to be performed by the controller 108, and a reject button 606-B that, when selected by the user, is configured to cause the notification application 120 to send an alert response message to the vehicle 102 to indicate that rain auto close actions are not to be performed by the controller 108. Thus, the alert 602 may allow for the user of the mobile device 118 to decide whether to perform window closures or the other actions specified by the notification settings 116.

Figure 6B:
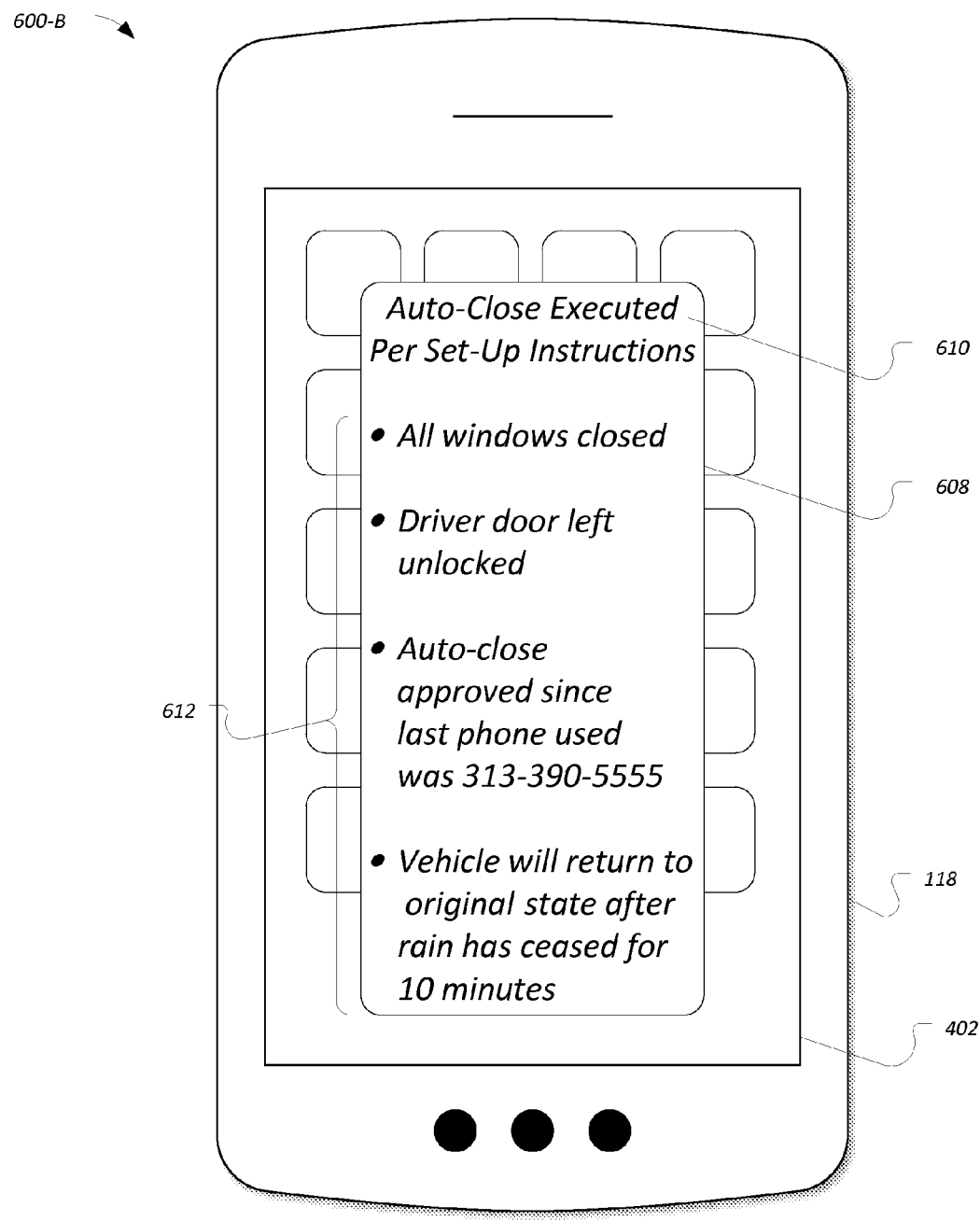
FIG. 6B illustrates an example user interface illustrating a close confirmation displayed on the display of the mobile device.

FIG. 6B illustrates an example user interface 600-B illustrating a close confirmation 608 displayed on the display 402 of the mobile device 118. The close confirmation 608 may be displayed by the notification application 120, for example, responsive to receipt of a message by the mobile device 118 sent from the telematics control unit 114 of the vehicle 102 responsive to completion of the actions specified by the notification settings 116 for performance by the controller 108 of the vehicle 102.

As shown, the close confirmation 608 may include a title label 610 to indicate to the user that the notification settings 116 were performed (or were not performed if, e.g., a window was obstructed and unable to close). The close confirmation 608 may also include a summary label 612 indicating the actions that were performed. For instance, the summary label 612 may indicate which openings were closed (e.g., all windows, all windows except vents), whether any doors were locked or unlocked (e.g., all doors locked, driver door left unlocked, etc.), any further details of the conditional closure (e.g., whether the close was approved based on an approved key fob 104 or mobile device 118 having been most recently used with the vehicle 102 before detection of the rain condition), and what actions, if any, the vehicle 102 may perform once the rain condition as concluded (e.g., reopen openings, leave openings closed, etc.).

Figure 7:
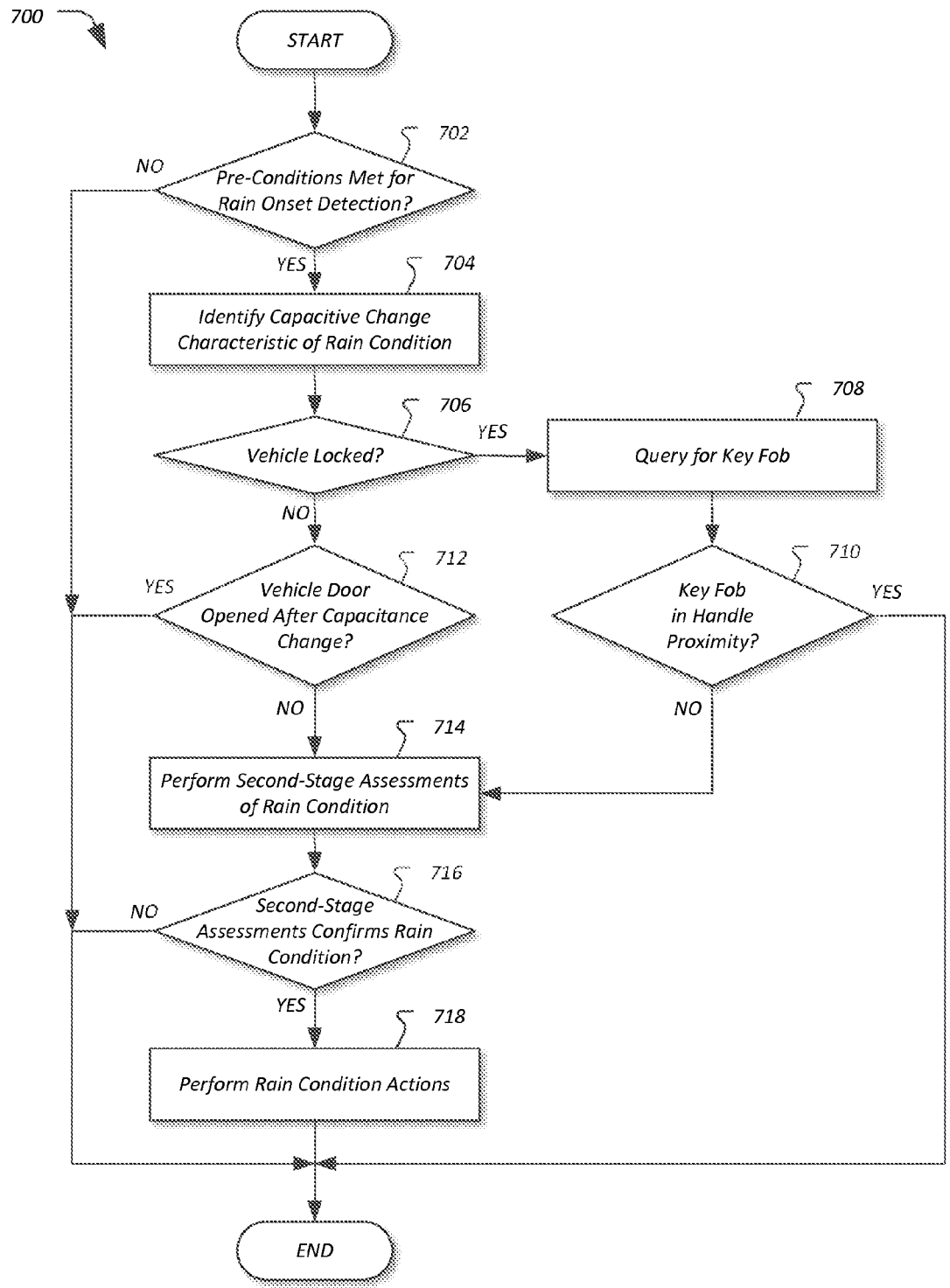
FIG. 7 illustrates an example process for rain detection to perform rain condition actions.

FIG. 7 illustrates an example process 700 for rain detection to perform rain condition actions. The process 700 may be performed by various devices, such as by the controller 108 of the vehicle 102 in communication with one or more capacitive sensors 106.

At operation 702, the controller 108 identifies whether pre-conditions are met for activation of rain onset detection. For instance, the rain sense feature may be enabled if the vehicle 102 has all doors closed and is not in a driving gear (e.g., the vehicle is in Park or Neutral). In another example, the controller 108 may access the notification settings 116 to confirm that the rain sense feature is enabled. If the pre-conditions are met, control passes to operation 704. Otherwise, the process 700 ends.

At operation 704, the controller 108 identifies a capacitive change characteristic of a rain condition. As some examples, the controller 108 may detect a rain condition using sensor data 202 from a capacitive sensor 106 and a detection threshold 204 as discussed above with respect to FIG. 2, or may detect a rain condition using sensor data 202 from a plurality of capacitive sensors 106 as discussed above with respect to FIG. 3.

At operation 706, the controller 108 determines whether the vehicle 102 was parked with the doors electronically locked. In some scenarios, such as in the case of a family picnic or parked in the home driveway, users may leave their vehicles 102 unlocked. When a vehicle 102 is unlocked, or if a door is ajar, many PEPS systems may not search for a PEPS key fob 104. If the vehicle 102 is electronically unlocked, control passes to operation 712. Otherwise, control passes to operation 708.

At operation 708, the controller 108 queries for a key fob 104 in proximity of the vehicle 102 handles. For example, the controller 108 may send a low-frequency key message to a key fob 104, and may listen for a high-frequency response from the key fob 104 including an identification code. If the key fob 104 is present, then the capacitive change may in fact be a result of a user attempting entry of the vehicle 102, independent of a rain condition.

At operation 710, the controller 108 determines whether or not the key fob 104 is in proximity of a vehicle 102 handle. For example, the controller 108 may determine whether the PEPS key fob 104 is within proximity of the handle low-frequency challenge zone of the door handles, indicating a normal PEPS passive entry operation. If no response is received from a key fob 104, or if no correct response is received from a key fob 104, or if the key fob 104 is determined to be within the vehicle cabin, then the controller 108 may conclude that the key fob 104 is not in the proximity of the vehicle 102 handle. If no key fob 104 is within handle proximity, control passes to operation 714. Otherwise, the process 700 ends. In some cases, if the key fob 104 is detected, the process 700 may transition to, or return to, a key unlock process performed by way of the PEPS system.

At operation 712, the controller 108 determines whether a vehicle 102 door is opened after the identified capacitance change detected by the capacitive sensors 106. This may be done to distinguish between conditions in which (a) the capacitance change is a result of user proximity to a handle of an unlocked door or (b) a result of rain. For example, a user may approach an unlocked vehicle without the key fob 104 in his or her possession and may open a door of the vehicle 102. In such an example, the identified capacitance change may be due to either a rain condition, a hand in proximity of the handle capacitive sensor 106, or both (e.g., a user racing to his or her vehicle 102 due to the rain). Moreover, it is also possible that two or more arriving passengers might grab door handles at nearly the same time to open the vehicle 102 doors. To distinguish between a rain condition and these other types of situations involving vehicle 102 entry, the controller 108 may be configured to look for a door opening occurrence within a predetermined time span (e.g., 2-3 seconds) coincident with, or just after, detection of a persistent large capacitance change on the vehicle door capacitive sensor 106 that detected a capacitance change characteristic of a rain condition.

At operation 714, the controller 108 performs second-stage assessments of the presence of a rain condition. For example, the controller 108 may: activate a smart-wipe rain sensor 112 to identify whether the windshield appears wet, activate connectivity to a local weather information source via an embedded telematics modem to determine whether rain is predicted, use onboard vehicle 102 humidity sensors to determine whether humidity levels are indicative of rain, compare lock and unlock capacitive sensors 106 on a given door handle for sensor data 202 confirming the rain condition, compare readings from other capacitive sensor 106 locations of the vehicle 102 for sensor data 202 confirming the rain condition, or use onboard vehicle 102 sun load sensors to identify the sun load presented to the vehicle 102.

At operation 716, the controller 108 determines whether the second-stage assessment confirms the rain condition. For example, if the rain sensor 112 indicates a wet condition, or if a humidity sensor confirms a humid condition, the controller 108 may identify the rain condition as confirmed, and may transition to operation 718. Otherwise, the process 700 ends.

At operation 718, the controller 108 performs rain condition actions. An example of further aspects of the rain condition actions are described in detail below with respect to the process 800. After operation 718, the process 700 ends. Variations on the process 700 may be possible. For example, the controller 108 may rely on the capacitive change characteristic of a rain condition, without further performing the second-stage assessments in operation 714 and operation 716.

Figure 8:
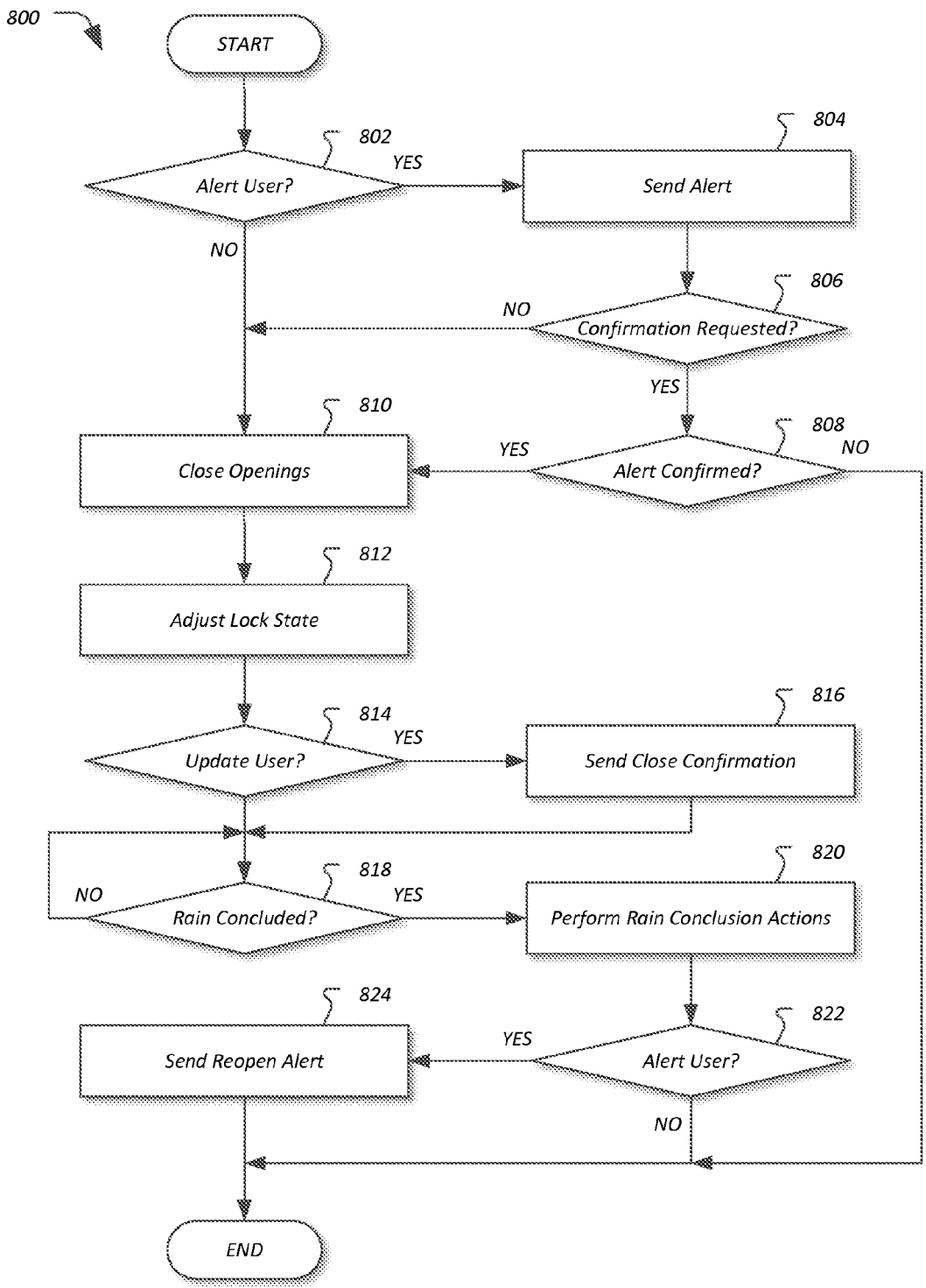
FIG. 8 illustrates an example process for performing rain condition actions in response to a detected rain condition.

FIG. 8 illustrates an example process 800 for performing rain condition actions in response to a detected rain condition. As with the process 700, the process 800 may be performed by various devices, such as by the controller 108 of the vehicle 102.

At operation 802, the controller 108 determines whether to send an alert 602 to the user. In an example, the controller 108 may access the notification settings 116 to determine whether the user has selected to be alerted of the rain condition. If the controller 108 determines to send the alert 602 to the user, control passes to operation 804. Otherwise, control passes to operation 810.

At operation 804, the controller 108 sends an alert 602 message to the mobile device 118 of the user. In an example, the controller 108 directs the telematics control unit 114 to send the alert message to the mobile device 118 most recently paired with the telematics control unit 114. In another example, the controller 108 directs the telematics control unit 114 to send the alert message to a mobile device 118 specified by the notification settings 116. An example display of the alert 602 message by the mobile device 118 is discussed above with respect to FIG. 6A.

At operation 806, the controller 108 determines whether a confirmation of the alert 602 was requested. In an example, the controller 108 may access the notification settings 116 to determine whether the user has selected to confirm the rain condition before allowing the controller 108 to perform rain condition actions. If the controller 108 determines confirmation is required, control passes to operation 808. Otherwise, control passes to operation 810.

At operation 808, the controller 108 determines whether an alert 602 confirmation was received by the vehicle 102. In an example, the controller 108 may receive a message from the telematics control unit 114 indicating that the alert response message was returned to the vehicle 102 to indicate that rain auto close actions specified by the notification settings 116 are to be performed by the controller 108 (e.g., responsive to user selection of the confirm button 606-A of the alert 602). In another example, the controller 108 may receive a message indicating that rain auto close actions are not to be performed. In yet a further example, the controller 108 may not receive a confirmation message within a predetermined timeout period (e.g., two minutes, ten minutes, etc.). If a confirmation is received within the predetermined timeout period, control passes to operation 810. Otherwise the process 800 ends.

At operation 810, the controller 108 closes vehicle 102 openings. For example, the controller 108 may access the notification settings 116 to determine which vehicle 102 openings to close (e.g., all windows, all windows except vents, etc.). For the openings identified to be closed, the controller 108 may initiate a close action to at least one power window actuator 110 (e.g., a close action for a door window, a vent window or a sunroof). For vehicles 102 that support the reporting of window position information, the controller 108 may be configured to record the positions of the windows before being closed, and may close only those windows indicated as being open. For vehicles 102 that do not support the reporting of windows position information, the controller 108 may, for example, record an amount of time taken to close a window until the power window actuator 110 indicates a closed condition. These times to close the window may also be stored.

At operation 812, the controller 108 adjusts the vehicle 102 lock state. For example, the controller 108 may access the notification settings 116 to determine what vehicle 102 lock actions to perform (e.g., lock all doors, lock all doors but ensure driver door is unlocked, etc.). As another example, based on the recorded window position information, the controller 108 may determine whether vehicle 102 doors are locked, and further whether any automatically closed windows were previously open greater than a particular threshold (e.g., a predefined distance or percentage amount open). In such a situation, the user may have intentionally left a window open to have access to the cabin of the vehicle 102. Since the open windows were closed in operation 810, the user may no longer have access to the cabin and may effectively be locked out. Accordingly, if a closed window is determined to have been open greater than the particular threshold (e.g., distance or percentage open), then the controller 108 may unlock one or more vehicle 102 doors (e.g., the door with the automatically closed window previously open greater than the particular amount or percentage, all doors, etc.) to allow the user to maintain access to the vehicle 102 and not be locked out. As another example, the controller 108 may identify whether the PEPS key fob 104 is within a locked vehicle 102 cabin with automatically closed windows that were previously open greater than the particular threshold, and may unlock one or more vehicle 102 doors if these conditions are met. The controller 108 may also maintain a record of which doors were automatically unlocked.

At operation 814, the controller 108 determines whether to update the user regarding the performed actions. For example, the controller 108 may access the notification settings 116 to determine whether the user desires to receive a close confirmation 608 of the performed actions. If the notification settings 116 indicate for the user to be alerted, control passes to operation 816. Otherwise, control passes to operation 818.

At operation 816, the controller 108 sends the close confirmation 608 to the mobile device 118 of the user. In an example, the controller 108 directs the telematics control unit 114 to send the close confirmation 608 message to the mobile device 118 most recently paired with the telematics control unit 114. In another example, the controller 108 directs the telematics control unit 114 to send the close confirmation 608 message to a mobile device 118 specified by the notification settings 116. An example display of the close confirmation 608 message by the mobile device 118 is discussed above with respect to FIG. 6B.

At operation 818, the controller 108 determines whether the rain condition as concluded. For example, as discussed above with respect to FIGS. 2 and 3, the controller 108 may identify a capacitive change characteristic of the conclusion of a rain condition. In some cases, the controller 108 may further perform a second-stage assessment to confirm the conclusion of the rain condition, such as by way of a rain sensor 112 no longer indicating a wet condition, or a sun load sensor indicating a level of sun load consistent with the sun being out.

At operation 820, the controller 108 performs rain conclusion actions. For example, the controller 108 may access the notification settings 116 to determine whether to reopen the vehicle 102 openings, whether to return the windows to their previous state, or whether to keep the vehicle 102 openings in the closed state. The controller 108 may further utilize the notification settings 116 to determine a period of time to wait before reopening the vehicle 102 openings (e.g., immediately, a wait of two minutes, a wait of ten minutes, etc.). Based on the notification settings 116, the controller 108 may initiate an open action to at least one power window actuator 110 (e.g., an open action for a door window, a vent window or a sunroof). For vehicles 102 that support the reporting of window position information, the controller 108 may be configured to reopen the windows to the recorded positions of the windows before being closed. For vehicles 102 that do not support the reporting of windows position information, the controller 108 may, for example, power the power window actuators 110 for recorded amounts of time taken to close the windows. In some examples, based on the recorded door unlock information, the controller 108 may also re-lock any doors that may have been automatically unlocked in operation 812.

At operation 822, the controller 108 determines whether to alert the user of the performance of the rain conclusion actions. For example, the controller 108 may access the notification settings 116 to determine whether to alert the user of the rain conclusion actions. If so, control passes to operation 824. Otherwise, the process 800 ends.

At operation 824, the controller 108 sends a reopen confirmation message to the mobile device 118 of the user. In an example, the controller 108 directs the telematics control unit 114 to send the reopen confirmation message to the mobile device 118 to which the alert 602 or close confirmation 608 was sent. The reopen confirmation message may be similar to the close confirmation 608 message, but may include information regarding changes made upon the conclusion of the rain condition rather than because of it. Similar to the close confirmation 608, the reopen confirmation may be displayed in the user interface of the mobile device 118. After operation 824, the process 800 ends.

Thus, the system 100 of a vehicle 102 for rain detection may automatically close windows upon detection of the rain condition using existing capacitive sensors 106 that may be free of both incremental part cost and incremental KOL. Moreover, additional add-on features or applications may be made possible by way of the rain detection system 100.

As an example, similar to the identification of rain due to a detected change in capacitance, the rain detection system 100 may similarly detect snow build-up on a stationary vehicle. Upon a determination of snow buildup, the rain detection system 100 may be configured to request for a telematics control unit 114 of the vehicle 102 to send a telematics alert to let the vehicle user know additional time may be required to clean their vehicle or driveway of accumulated snow. As another possibility, upon the snow determination the rain detection system 100 may query the vehicle user for whether the vehicle 102 should initiate a remote start action.

As another example, data from the rain detection system 100 may be forwarded to a data gathering system for aggregation and further processing. For example, vehicles 102 may provide rain activity data indicative of when rain conditions are detected (regardless of whether any windows were closed), along with location data for the vehicles 102. Based on the received data, the data gathering system may construct a weather map indicative of precipitation in the area in which the vehicles 102 may be located. Such a data gathering system may be particularly useful in relatively rural regions lacking adequate radar or weather gathering services, but in which vehicles 102 implementing the rain detection system 100 may be located.

In general, computing systems and/or devices, such as the controller 108, telematics control unit 114, and mobile device 118, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controller 108, telematics control unit 114, and mobile device 118, generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controller 108 may be such computer program products. In some example, these computer program products may be provided as software that when executed by one or more processors provides the operations described herein. Alternatively, the computer program products may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
 a telematics control unit; and
 a controller in communication with the telematics control unit and a plurality of capacitive sensors, programmed to
  access notification settings to determine a mobile device to notify of a rain condition identified using the sensors;
  command the telematics control unit to send a rain alert to the mobile device to obtain confirmation to perform rain condition actions;
  close vehicle openings responsive to receiving the confirmation; and
  command the telematics control unit to send a close confirmation to the mobile device indicating the rain condition actions that were performed.

2. The system of claim 1, wherein the notification settings specify sending the rain alert to the mobile device that was most recently paired to the telematics control unit.

3. The system of claim 1, wherein the notification settings are associated with a key fob that was most recently used to access the vehicle, and specify the mobile device to send the rain alert as the mobile device associated with the key fob.

4. The system of claim 1, wherein the notification settings specify at least one of: (i) which of the vehicle openings to close responsive to receiving the confirmation; and (ii) which vehicle doors to unlock responsive to receiving the confirmation.

5. The system of claim 1, wherein the notification settings specify a geo-fence region in which the rain condition identified using the sensors is to be ignored.

6. The system of claim 1, further comprising a head unit display, wherein the telematics control unit is programmed to:
 display, on the head unit display, a user interface for configuration of the notification settings; and
 update the notification settings responsive to input to the user interface.

7. The system of claim 1, wherein the telematics control unit is programmed to:
 send the notification settings to the mobile device for configuration using a user interface of the mobile device;
 receive a change to the notification settings from the mobile device; and
 update the notification settings responsive to the change.

8. The system of claim 1, wherein the controller is further programmed to:
 identify sensor data indicative of a consistent change in capacitance across sensor data received from a plurality of capacitive door handles of the vehicle; and
 identify the rain condition according to measuring a capacitive change beyond a capacitive sensor detection threshold.

9. The system of claim 1, wherein the controller is further programmed to command the telematics control unit to send a rain conclusion alert to the mobile device responsive to detecting a conclusion of the rain condition.

10. The system of claim 1, wherein the telematics control unit is further programmed to:
 send a current location of the vehicle and current windows status information to a backend server;
 receive an alert from the backend server when a weather service in communication with the server indicates rain approaching to the current location of the vehicle; and
 send the alert to the controller to cause the controller to confirm the rain condition.

11. A method comprising:
 receiving, from a mobile device, notification settings to apply to a vehicle controller;
 identifying, by the controller, a rain condition according to a capacitive change across sensor data received from external capacitive sensors of the vehicle;
 sending a rain alert to the mobile device obtaining confirmation to perform rain condition actions specified by the notification settings; and
 sending a close confirmation to the mobile device indicating the rain condition actions that were performed.

12. The method of claim 11, wherein the notification settings specify which vehicle openings to close responsive to receiving the confirmation.

13. The method of claim 11, wherein the notification settings specify one or more vehicle doors to unlock responsive to receiving the confirmation.

14. The method of claim 11, wherein the notification settings specify a geo-fence region in which the rain condition identified using the sensors is to be ignored.

15. The method of claim 11, further comprising sending a rain conclusion alert to the mobile device responsive to detecting a conclusion of the rain condition.

16. The method of claim 11, wherein the notification settings specify which vehicle openings to close responsive to receiving the confirmation.

17. The method of claim 11, wherein the notification settings specify one or more actions to perform responsive to detecting a conclusion of the rain condition, the actions specifying one or more of whether to reopen vehicle openings responsive to detecting the conclusion of the rain condition, whether to leave the vehicle openings in a closed state responsive to detecting the conclusion of the rain condition, and a period of time after detecting the conclusion of the rain condition to wait before reopening the vehicle openings.

18. A system comprising:
 a mobile device programmed to
  display a user interface specifying notification settings to apply to a vehicle controller programmed to determine rain conditions;
  receive, from the vehicle controller, a rain alert requesting confirmation to perform rain condition actions specified by the notification settings;
  send, responsive to user input to the mobile device, a confirmation to perform the rain condition actions,
  receive a close confirmation indicating the rain condition actions that were performed; and
  display a user interface including the close confirmation.

19. The system of claim 18, wherein the mobile device is further programmed to:
 receive a rain conclusion alert responsive to detecting a conclusion of the rain condition, and
 display a user interface including the rain conclusion alert.

* * * * *

UNITED STATES PATENT AND TRADEMARK OFFICE
CERTIFICATE OF CORRECTION

PATENT NO. : 9,752,370 B2
APPLICATION NO. : 14/797682
DATED : September 5, 2017
INVENTOR(S) : John Robert Van Wiemeersch et al.

Page 1 of 1

It is certified that error appears in the above-identified patent and that said Letters Patent is hereby corrected as shown below:

In the Claims

Column 20, Line 18:
After "*the rain condition actions*"
Delete "*that were*" and insert -- *as* --

Signed and Sealed this
Seventh Day of November, 2017

Joseph Matal
*Performing the Functions and Duties of the
Under Secretary of Commerce for Intellectual Property and
Director of the United States Patent and Trademark Office*